United States Patent [19]

Ohtake

[11] Patent Number: 5,790,309

[45] Date of Patent: Aug. 4, 1998

[54] ZOOM LENS SYSTEM CAPABLE OF SHIFTING AN IMAGE AND COMPENSATING BACK FOCUS VARIATION

[75] Inventor: Motoyuki Ohtake, Kanagawa-ken, Japan

[73] Assignee: Nikon Corporation, Tokyo, Japan

[21] Appl. No.: 536,797

[22] Filed: Sep. 29, 1995

[30] Foreign Application Priority Data

Sep. 29, 1994 [JP] Japan .................................. 6-259055
Oct. 26, 1994 [JP] Japan .................................. 6-286017

[51] Int. Cl.$^6$ ........................... G02B 27/64; G02B 15/14
[52] U.S. Cl. ..................... 359/557; 359/684; 359/685; 359/691; 359/692
[58] Field of Search ........................... 359/557, 684, 359/685, 691, 692

[56] References Cited

U.S. PATENT DOCUMENTS

| | | | |
|---|---|---|---|
| 5,168,403 | 12/1992 | Umeda et al. | 359/557 |
| 5,502,594 | 3/1996 | Suzuki et al. | 359/557 |
| 5,530,589 | 6/1996 | Sato | 359/557 |
| 5,559,635 | 9/1996 | Sato | 359/557 |
| 5,598,299 | 1/1997 | Hayakawa | 359/557 |

FOREIGN PATENT DOCUMENTS 2-66536  3/1990  Japan.

*Primary Examiner*—David C. Nelms
*Assistant Examiner*—Evelyn A. Lester
*Attorney, Agent, or Firm*—Oliff & Berridge

[57] ABSTRACT

A zoom lens system in which the back focus variations that accompany the movement of a shift lens unit can be compensated. During image shifting, the shift lens unit can be moved in a direction substantially perpendicular to an optical axis in order to shift an image. The shift lens unit also moves a small amount along the optical axis, thereby creating a back focus variation. A focusing lens unit is provided that moves along the optical axis to compensate for the variations in the back focus created by the shift lens unit during image shifting. A variation amount of the spherical aberration for the highest marginal rays at each focal length condition, when the shift lens unit undergoes a small change in position along the optical axis, divided by the amount of movement of the shift lens unit in the perpendicular direction is less than zero and greater than negative one. Additionally, the absolute value of the focal length of the lens units, from the lens unit nearest the object side to the shift lens unit, divided by the focal length of the entire lens system is greater than 0.25 and less than 0.8.

13 Claims, 40 Drawing Sheets

ZOOM LENS SYSTEM CAPABLE OF SHIFTING AN IMAGE AND COMPENSATING BACK FOCUS VARIATION

BACKGROUND OF THE INVENTION

1. Field of the Invention

This invention relates to a zoom lens system on which image shift is possible. More specifically, this invention relates to a zoom lens system on which the image can be shifted by moving a lens unit that forms a portion of the zoom lens system in a direction substantially perpendicular to the optical axis.

2. Description of Related Art

Through electrical and mechanical advances in the technology of various components from which cameras are structured, the automation of various operations such as auto-exposure, auto-focus, automatic winding/rewinding of film, and the like has progressed. Recently, in particular, insufficient exposure and image blur have sharply declined because of the shift to high precision auto-focusing and auto-exposure. Along with the advancement in the technology of these components, the camera bodies have become smaller and more lightweight.

In addition, in recent years, zoom lenses with a high zoom ratio that have a zoom ratio of more than two times have increased. The focal lengths at the telephoto ends of these zoom lenses have increased, and it has become possible to take impressive photographs that make the image appear closer than the actual object.

However, because the cameras have become smaller and more lightweight, and because the focal length has become longer, photograph failures may occur because of camera shaking. There have been various proposals relating to so-called vibration reduction optical systems that shift the image to correct image blur that arises from fluctuation due to camera shaking. In particular, various proposals have been presented for zoom lenses that move a portion of the zoom lens system in a direction substantially perpendicular to the optical axis, correcting image blur that is caused by camera shaking.

Methods of supporting the lenses when the shift lens unit is moved in a direction substantially perpendicular to the optical axis have been introduced, for example, in Japanese Laid-Open Patent Application Hei 2-66536. FIG. 51 is a drawing that describes the conventional lens supporting method introduced in this application.

In FIG. 51, the shift lens unit GS is held by the lens barrel 1, and one end of each of at least three flexible supporting rods 2 is attached to the lens barrel 1 in a manner that allows rotation. Only two flexible supporting rods 2 are shown in the drawing. The other end of each of the flexible supporting rods 2 is attached to the corresponding support points 3 in a manner that allows rotation.

As shown by the dashed lines in the drawing, when each flexible supporting rod 2 is positioned in parallel to the optical axis AX of the photographic optical system, the shift lens unit GS is centered in relation to the optical axis AX. However, when each flexible supporting rod 2 rotates about its support point 3 in the clockwise direction, the shift lens unit GS moves in a direction perpendicular to the optical axis AX (toward the top of the drawing) and along the optical axis AX toward the right side of the drawing, as shown by the solid lines in the drawing. In other words, since the shift lens unit GS is supported and driven so as to move in an arc-shaped path perpendicular to the optical axis AX, when the image is shifted there is also a movement of the shift lens unit GS along the optical axis.

As described above in relation to the lens supporting method introduced in Japanese Laid-Open Patent Application Hei 2-66536, as the shift lens unit moves in a direction perpendicular to the optical axis, the shift lens unit also moves along the axis. Therefore, the back focus changes as a result of the movement along the optical axis. In this manner, on conventional zoom lenses that move the shift lens unit in an arc-shaped path that is perpendicular to the optical axis, an inconvenient back focus variation occurs along with the movement of the shift lens unit.

SUMMARY OF THE INVENTION

This invention has been conceived in light of the problems stated above and provides a zoom lens system that is able to shift the image by moving a shift lens group while the variation of the optical performance is suppressed and suppresses the variation of the back focus caused by moving the shift lens unit along the optical axis when the shift lens unit is shifted perpendicular to the optical axis.

This invention provides two ways to solve the problem. One of these ways is achieved by providing a zoom lens system on which it is possible to move all or part of a shift lens unit GB that forms part of the zoom lens system in a direction substantially perpendicular to the optical axis to shift the image, wherein a lens unit GA is provided that moves along the optical axis in order to compensate variations in the back focus that occur when all or part of the shift lens unit GB moves in a direction substantially perpendicular to the optical axis. It should be appreciated that variation of the back focus and movement of the Gaussian image plane along the optical axis have the same meaning.

Another of the ways of solving the problem is achieved by providing a zoom lens system with which it is possible to move all or part of a lens unit GB that forms part of the zoom lens system in a direction substantially perpendicular to the optical axis as a shift lens unit and to shift the image. If $\Delta Bf$ is the back focus variation amount that occurs due to the small change in position along the optical axis that accompanies the movement of the shift lens unit in a direction substantially perpendicular to the optical axis, $\Delta SA$ is the variation amount of the spherical aberration for the highest marginal rays at each focal length condition is $\Delta SA$, the combined focal length of the lens units from the lens unit nearest the object side to the shift lens unit at or near a substantially maximum telephoto state is fb, and ft is the focal length of the entire zoom lens system at or near the substantially maximum telephoto state, the following conditions are fulfilled:

$$-1 < \Delta SA/\Delta Bf < 0$$

$$0.25 < |fb|/ft < 0.8$$

BRIEF DESCRIPTION OF THE DRAWINGS

The invention will be described in detail with reference to the following drawings in which like reference numerals refer to like elements and wherein.

DETAILED DESCRIPTION OF PREFERRED EMBODIMENTS

Figure 1:
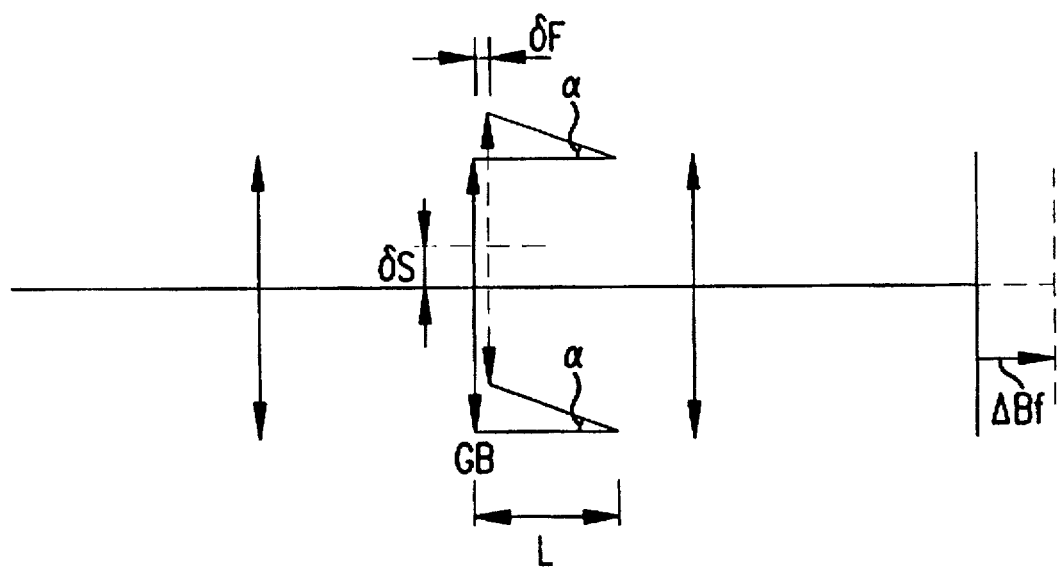
FIG. 1 is a drawing that shows the relationship between the movement amount of the shift lens unit in a direction perpendicular to the optical axis and the movement amount in a direction along the optical axis.

The method of shifting the image will first be described.

Generally, when a lens unit that is one of the lens units forming the zoom lens system is moved in a direction perpendicular to the optical axis as the shift lens unit, the image obtained on the image plane moves in a direction perpendicular to the optical axis in conjunction with the movement of the shift lens unit.

However, when the shift lens unit is moved in a direction substantially perpendicular to the optical axis, changes in the various aberrations occur in connection with the shifting of the image causing the optical performance to suffer. Thus, it is necessary to suppress the variations of the various aberrations that are caused by movement of the shift lens unit to thereby reduce the loss of optical performance.

A method of suppressing the variations in the various aberrations that occur when the shift lens unit is moved in a direction substantially perpendicular to the optical axis will be described below.

Generally, in zoom lens systems, when the sine condition becomes positively larger than the spherical aberration, the coma aberration shows negative tendency in the off axis area that is slightly separated from the optical axis. Conversely, when the sine condition becomes negatively larger than the spherical aberration, the coma aberration shows positive tendency.

Therefore, when the spherical aberration and the sine condition are not properly corrected by the shift lens unit alone, a coma aberration occurs in the center of the field when the shift lens unit moves off from the optical axis. In other words, a noticeable decline in optical performance at the center of the field occurs when the shift lens unit is shifted.

In addition, if the independent Petzval sum of the shift lens unit is not an appropriate value, when the shift lens unit is moved away from the optical axis, a curvature of image field will incline. Therefore, an appropriate value must be selected for the independent Petzval sum of the shift lens unit, thereby suppressing the inclination of the curvature of the image plane that occurs when the shift lens unit is moved.

Furthermore, if the correction of the chromatic aberration of the shift lens unit is insufficient, unnecessary variations in the chromatic aberration will occur when the shift lens unit is moved.

In the zoom lens system of this invention, the shift lens unit is moved in a direction substantially perpendicular to the optical axis, causing the image to shift. Therefore, for example, by combining a detecting device that detects camera shaking and a driving device that moves the shift lens unit in a direction substantially perpendicular to the optical axis within the zoom lens system of this invention, the shift lens unit can be properly driven by the driving device. The image blurs due to camera shaking can be offset by the shift of the image due to the movement of the shift lens unit.

A specific method of compensating variations in the image position that are caused by camera shaking or the like will next be described.

The zoom lens system is in a substantially maximum telephoto state when the lens units of the zoom lens system are at or near a telephoto end of the zoom lens system. The zoom lens system is in a substantially maximum wide angle state when the lens units of the zoom lens system are at or near a wide angle end of the zoom lens system. If f is the arbitrary focal length from the maximum wide angle state to the maximum telephoto state of the zoom lens system of this invention, and if ε is the angle of inclination of the entire zoom lens system from a plane that includes the optical axis of the zoom lens system, the amount of variation δ' of the image position on the image surface is expressed by the following formula (a).

$$\delta = f \cdot \tan \epsilon \qquad (a)$$

However, if the angle of inclination ε is very small, the amount of variation δ' of the image position is approximated by the following formula (a').

$$\delta' = f \cdot \epsilon \qquad (a')$$

If the lateral magnification of the lens unit positioned closer to the image side than the shift lens unit is βb and the lateral magnification of the shift lens unit is βa, and amount of position variation of the shift lens unit perpendicular to the optical axis is Δ, the shift amount δ of the light rays near the axis is given by the following formula (b).

$$\delta = \Delta \cdot \beta b \cdot (1 - \beta a) \qquad (b)$$

As |βb*(1−βa)| decreases, the required movement amount of the shift lens unit for shifting the image a given amount becomes too large, and the driving mechanism for driving the shift lens unit perpendicular to the optical axis becomes complicated. Conversely, as |βb*(1−βa)| increases, since errors in the position control of the shift lens unit are magnified too much on the image surface, it becomes difficult to carry out movement regulation of the shift lens unit. Therefore, it is necessary to choose an appropriate value of the lateral magnification βb of the lens unit that is positioned closer to the image side than the shift lens and the magnification βa of the shift lens unit.

To compensate the amount of variation δ' of the image position when the zoom lens system is tilted in the amount of the angle of inclination ε, the shift lens unit may be moved in a direction perpendicular to the optical axis such that δ'=−δ, shifting the image in the amount of −δ. From formulas (a') and (b), the relationship expressed by the following formula (c) is established between the angle of inclination ε and the position variation amount Δ.

$$\Delta = \epsilon * f / \{\beta b * (1-\beta a)\} \quad (c)$$

By changing the position of the shift lens unit in the amount of Δ in a direction perpendicular to the optical axis so that the above-mentioned formula (c) is satisfied, the movement amount δ' of the image position caused by the vibration of the angle of inclination ε of the zoom lens system due to camera shaking or the like is compensated by the image shift amount δ from the vibration reduction action. Thus, vibration reduction, or in other words, compensation of the image position movement, is possible.

Figure 51:
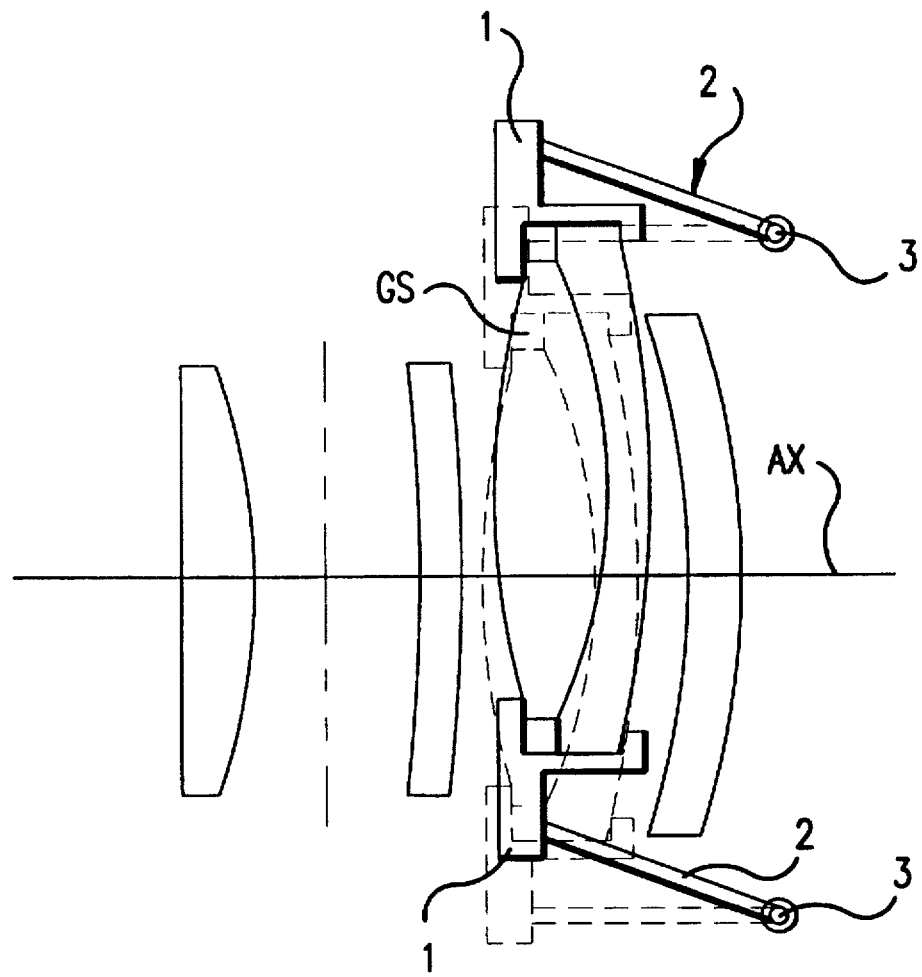
FIG. 51 is a drawing that illustrates a conventional lens supporting method.

As shown in FIG. 51, and described in relation to the prior art, when the shift lens unit is supported by the multiple supporting rods by the cantilever holding method, when the shift lens unit is moved in a direction substantially perpendicular to the optical axis, the shift lens unit also moves along the optical axis. FIG. 1 shows the relationship between the movement amount of the shift lens unit in a direction perpendicular to the optical axis and the movement amount along the optical axis.

In FIG. 1, if α is the angle of the supporting arms from the horizontal and L is the length of the supporting arms, the movement amount δs of the shift lens unit GB in the direction perpendicular to the optical axis and the movement amount δF along the optical axis are expressed by the following formulas (d) and (e), respectively.

$$\delta s = L * \sin \alpha \quad (d)$$

$$\delta F = L - L * \cos \alpha \quad (e)$$

So, it makes the movement δF small to become the length L of the supporting arms long when the shift lens unit is moved a fixed amount in the direction perpendicular to the optical axis. However, the greater length L of the supporting arms, the greater the space required along the optical axis. Therefore, from the standpoint of using space effectively, the length L of the supporting rods cannot be too great.

If β is the effective lateral magnification of the lens unit positioned closer to the image side than the shift lens unit, the back focus variation amount ΔBf that is attributable to the movement amount δF of the shift lens unit along the optical axis is expressed by the following formula (f).

$$\Delta Bf = \beta^2 * \delta F \quad (f)$$

Figure 2:
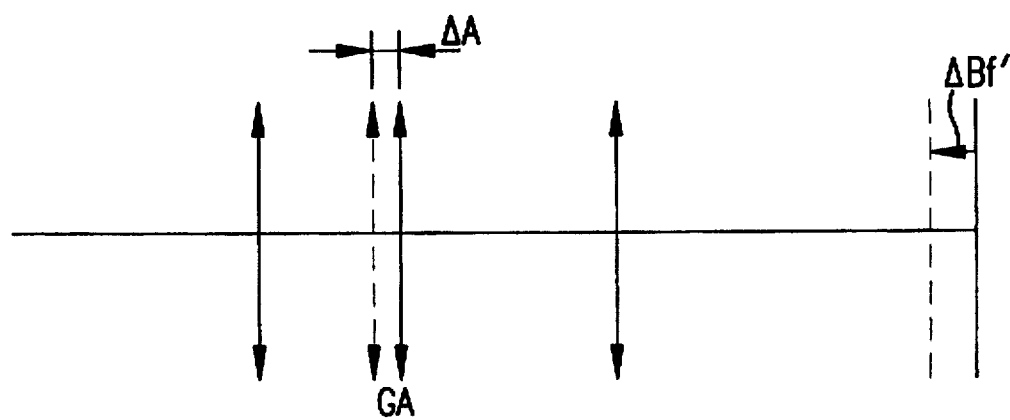
FIG. 2 is a drawing that illustrates the variation in the back focus that arises from the movement of the shift lens unit in the direction along the optical axis.

FIG. 2 is a drawing that illustrates the variation in the back focus that arises from the movement of the lens unit along the optical axis.

As shown in FIG. 2, if $\beta_1$ is the effective lateral magnification of the lens unit positioned closer to the image side than the lens unit GA, the back focus variation amount ΔBf' when the lens unit GA is moved in the direction parallel to the optical axis in the amount of ΔA is expressed by the following formula (g).

$$\Delta Bf' = \beta_1^2 * \Delta A \quad (g)$$

Therefore, the image surface position can be optically fixed by moving the lens unit GA so that ΔBf−ΔBf'=0. The back focus variation amount ΔBf from the movement δF along the optical axis of the shift lens unit is compensated by the back focus variation amount ΔBf' from the movement ΔA along the optical axis of the lens unit GA. In this case, it can be seen that is necessary to fulfil the relationship shown by the following formula (h), which is derived from the preceding formulas (f) and (g).

$$\beta^2 * \delta F = \beta_1^2 * \Delta A \quad (h)$$

In this manner, by appropriately moving the lens unit GA so that the relationship shown in formula (h) is fulfilled, the back focus variation that accompanies the movement of the shift lens unit when the image is shifted can be compensated.

In this invention, through the combined use of the lens unit GA that compensates the back focus variation at the time of image shift and the focusing lens unit that moves along the optical axis for close-range focusing, it is possible to simplify the structure of the zoom lens system. In particular, the optical performance can be maintained even when the focusing lens unit moves over a relatively wide range along the optical axis when the position of the object changes from infinite to close range. Therefore, a high optical performance can be obtained even when the back focus variation at the time of image shift is compensated by the focusing lens unit.

In addition, as another advantage of this invention, the focusing lens unit differs from lens units that can only move along a cam groove (through zooming). Since the focusing lens unit can move independently with respect to the other lens units, the structure of the lens barrel can be easily controlled.

The lens unit GA should be positioned closer to the object side than the shift lens unit GB. If the lens unit GA is positioned closer to the image side than the shift lens unit GB, the lateral magnification is changed even if the same focal length state when the photographic distance varies and the lateral magnification βb of the lens units positioned closer to the image side than the shift lens unit GB changes as does the magnification of the shift lens unit. As a result, the amount of movement of the shift lens unit required to shift the image a given amount changes. Therefore, it becomes difficult to control the image shift through the shift lens unit GB and the back focus variation compensation through the lens unit GA. Thus, it is preferable for lens unit GA to be positioned closer to the object side than shift lens unit GB.

In this invention, through moving the lens unit GA so that the above-mentioned formula (h) is fulfilled, the back focus variations in the region near the axis can be compensated. However, when applied to a large diameter lens, in particular, it is preferable to compensate the back focus variations so that the position at which the spot diagram at the center of the field is the smallest or the position at which the MTF (modulcation transfer function) for a fixed spatial frequency is the highest, is taken as the best image plane, and the position of the best image plane is fixed.

Generally, it is very difficult to completely free the lens systems from aberrations, even after aberration is corrected. In particular, when an aberration correction condition is given at the center of the field on the image surface, differences from the standard wavelength or monochromatic spherical aberration, axial chromatic aberration, or chromatic spherical aberration still remain.

The position of the so-called Gaussian image plane, which is the image surface according to Gaussian theory, and the position of the so-called best image plane, which is the image surface obtained by the best optical performance, are shifted along the optical axis.

Therefore the defocus amount δd of the distance between the image plane and from the Gaussian image plane is influenced by the above-mentioned standard wavelength or monochromatic spherical aberration, the axial chromatic aberration, or by a chromatic spherical aberration. When the shift lens unit experiences a movement along the optical axis accompanying its movement in a direction perpendicular to the optical axis, the aberration correction condition changes, whereupon the defocus amount δd changes.

For example, the movement amount of the best image plane position when the shift lens unit moves along the optical axis can be expressed by the sum of the position variation amount of the Gaussian image plane, or in other words, the defocus variation amount ΔBf and the defocus amount δd, as shown by the following formula (i).

$$\Delta Bf' = \Delta Bf + \delta d \tag{i}$$

As described above, the axial chromatic aberration and the spherical aberration are corrected to a certain extent by the shift lens unit. However, when the shift lens unit experiences a movement along the optical axis accompanying its movement in a direction perpendicular to the optical axis, the incident height of light rays incident to the shift lens unit changes. Thus, the spherical aberration correction condition changes, causing the defocus amount δd to change.

When a positive spherical aberration occurs, the best image plane moves to the positive side, and the defocus amount δd becomes positive. Conversely, when a negative spherical aberration occurs, the best image plane moves to the negative side, and the defocus amount δd becomes negative.

If the back focus variation amount ΔBf and the defocus amount δd are made to be opposite each other, the best image plane movement amount ΔBf' that accompanies the movement of the shift lens unit along the optical axis can be suppressed, and decline in performance that results from the image position variation that accompanies the movement of the shift lens unit can be suppressed.

The zoom lens system of the second, third and fourth embodiments of this invention satisfies the following conditions (1) and (2):

$$-1 < \Delta SA/\Delta Bf < 0 \tag{1}$$

$$0.25 < |fb|/ft < 0.8 \tag{2}$$

where ΔBf = the back focus variation amount that occurs due to the small change in position of the shift lens unit in the optical axis direction;

ΔSA = the spherical aberration variation amount for the highest marginal ray at each focal length condition when the shift lens unit experiences a small change in position in the optical axis direction;

fb = the combined focal length at or near the maximum telephoto state of the lens units from the lens unit nearest the object side to the shift lens unit; and ft= the focal length of the entire zoom lens system at or near the maximum telephoto state.

Condition (1) controls the ratio of the spherical aberration variation and the back focus variation when the shift lens unit experiences a small change along the optical axis accompanying its change in position in a direction perpendicular to the optical axis.

Generally, the position of the Gaussian image plane is defined at the condition in which each lens component of the zoom lens system is positioned along the same axis. The spherical aberration is also defined at the same condition.

Therefore, the condition (1) for this invention is defined at the non-decentered condition, or in other words, at the condition before the image is shifted.

As described above, the movement of the best image plane is expressed by the sum of the movement of the Gaussian image plane and the defocus amount variation. If the upper limit of condition (1) is exceeded, the direction of movement of the Gaussian image plane is the same as the direction of the defocus amount variation, and the movement of the best image plane becomes very large. As a result, since the deterioration of the performance due to the movement of the best image plane position when the image is shifted becomes very large, the optical performance is insufficient.

Conversely, if the lower limit of condition (1) is breached, the variation of the spherical aberration becomes large with respect to the back focus variation, and the spherical aberration at the time of image shifting becomes too large. As a result, since the optical performance obtained at the best image plane declines noticeably, the optical performance is insufficient.

Condition (2) controls the ratio of the combined focal length fb at or near the maximum telephoto state of the lens units from the lens unit nearest the object side to the shift lens unit and the focal length ft of the entire zoom lens system at or near the maximum telephoto state, and controls the reciprocal of the effective magnification of the lens unit positioned at the image side of the shift lens unit at the time of image shifting.

If the upper limit of condition (2) is exceeded, the required amount of movement (in a direction perpendicular to the optical axis) of the shift lens unit to shift the image a given amount becomes quite large. Thus, the amount of movement of the shift lens unit in the optical axis direction becomes large, and it becomes difficult to suppress the variation of the best image plane that occurs when the image is shifted.

Conversely, if the lower limit of condition (2) is breached, since the required amount of movement (in a direction perpendicular to the optical axis) of the shift lens unit to shift the image a given amount becomes quite small, the amount of movement of the shift lens unit along the optical axis can be reduced. However, since the image is shifted a large amount even when the shift lens unit moves only a small amount in a direction perpendicular to the optical axis, it becomes difficult to control the position of the shift lens unit.

In this invention, in order to obtain an excellent optical performance, it is preferable for the minimum value of condition (1) to be −0.6 or for the maximum value of condition (2) to be 0.6.

In addition, in this invention, in order to obtain better optical performance when the image is shifted, it is preferable that the following condition (3) be satisfied:

$$0.1 < |fa|/ft \tag{3}$$

where fa= the focal length of the shift lens unit.

Condition (3) controls the focal length of the shift lens unit.

If the lower limit of condition (3) is breached, it is difficult to correct the spherical aberration that occurs from the shift lens unit independently. In particular, when the number of lens components in the shift lens unit is increased in order to correct the spherical aberration, the structure of the zoom lens system can become very complex.

As described above, the Gaussian image plane is defined at the condition in which each lens component of the zoom lens system is positioned along the same axis. No astigmatism occurs at the center of the field in this type of non-decentered condition. When a portion of the zoom lens system deviates from this common axis condition, the Gaussian image plane cannot be defined, and astigmatisms occur even in the center of the field.

In this invention, since aberrations that occur at the time the image is shifted by the shift lens unit are corrected, the position of the best image plane at the center of the field can be treated as substantially the same position in the non-eccentric condition and in the eccentric condition.

In addition, as stated previously, since the decline in performance at the time the image is shifted is suppressed, it is preferable to correct the independent spherical aberration of the shift lens unit and the sine condition, and also to correct the chromatic aberration. Thus, it is preferable for the shift lens unit to contain at least one positive lens component and at least one negative lens component.

The operation of this invention was summarized based on a method in which the shift lens unit is supported by a flexible supporting frame, but if the zoom lens system uses another lens holding method in which there is a movement of the shift lens unit in the direction parallel to the optical axis accompanying the movement in a direction perpendicular to the optical axis, such as a method that holds the lens using two parallel plate springs positioned parallel to the optical axis, the back focus variation compensation can be controlled in the same manner.

In addition, in this invention, it is possible to properly shift the image and compensate the variations of the image position that occur due to camera shaking by moving the shift lens unit in a direction substantially perpendicular to the optical axis. It is also possible, for example, to use the zoom lens system of this invention as a shift lens that moves through the photographic range.

Each embodiment of this invention is described below, with reference to the drawings.

Figure 3:
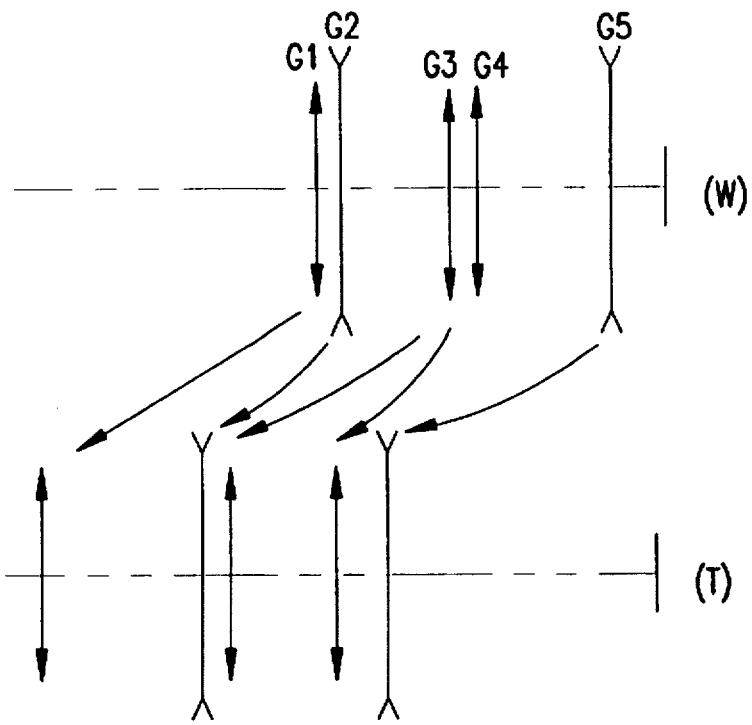
FIG. 3 is a drawing that shows the refractive power distribution of the zoom lens system pertaining to the first, second and third embodiments of this invention and the condition when each lens unit moves from a maximum wide angle state to a maximum telephoto state for the changing of magnification.

FIG. 3 is a drawing that shows the refractive power distribution of a zoom lens system pertaining to the first, second and third embodiments of this invention and the condition when each lens unit moves from a substantially maximum wide angle state at or near the wide angle end (W) of the zoom lens system to a substantially maximum telephoto state at or near the telephoto end (T) of the zoom lens system to change the focal length of the lens system.

As shown in FIG. 3, the zoom lens system that pertains to the first, second and third embodiments of this invention comprises, in order from the object side, a first lens unit G1 with a positive refractive power, a second lens unit G2 with a negative refractive power, a third lens unit G3 with a positive refractive power, a fourth lens unit G4 with a positive refractive power, and a fifth lens unit G5 with a negative refractive power. When the focal length changes from the maximum wide angle state to the maximum telephoto state, each lens unit moves toward the object side such that the distance between the first lens unit G1 and the second lens unit G2 increases, the distance between the second lens unit G2 and the third lens unit G3 decreases, the distance between the third lens unit G3 and the fourth lens unit G4 increases, and the distance between the fourth lens unit G4 and the fifth lens unit G5 decreases.

Figure 4:
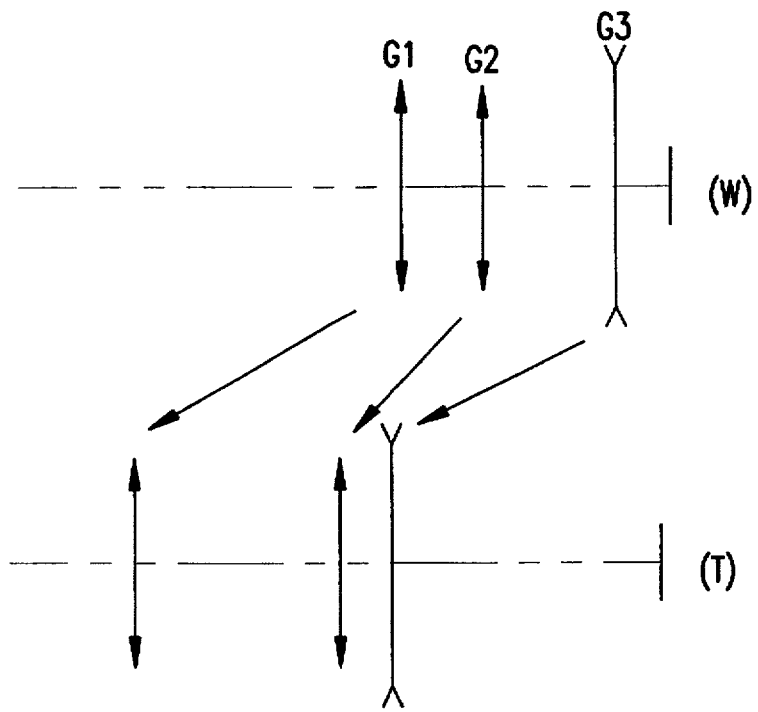
FIG. 4 is a drawing that shows the refractive power distribution of the zoom lens system pertaining to the fourth embodiment of this invention and the condition when each lens unit moves from the maximum wide angle state to the maximum telephoto state for the changing of magnification.

FIG. 4 is a drawing that shows the refractive power distribution of a zoom lens system pertaining to the fourth embodiment of this invention and the condition when each lens unit moves from the maximum wide angle state (W) to the maximum telephoto state (T) to change the focal length of the lens system.

As shown in FIG. 4, the zoom lens system that pertains to the fourth embodiment of this invention comprises, in order from the object side, a first lens unit G1 with a positive refractive power, a second lens unit G2 with a positive refractive power, and a third lens unit G3 with a negative refractive power. When the focal length changes from the maximum wide angle state to the maximum telephoto state, each lens unit moves toward the object side such that the distance between the first lens unit G1 and the second lens unit G2 increases and the distance between the second lens unit G2 and the third lens unit G3 decreases.

Figure 5:
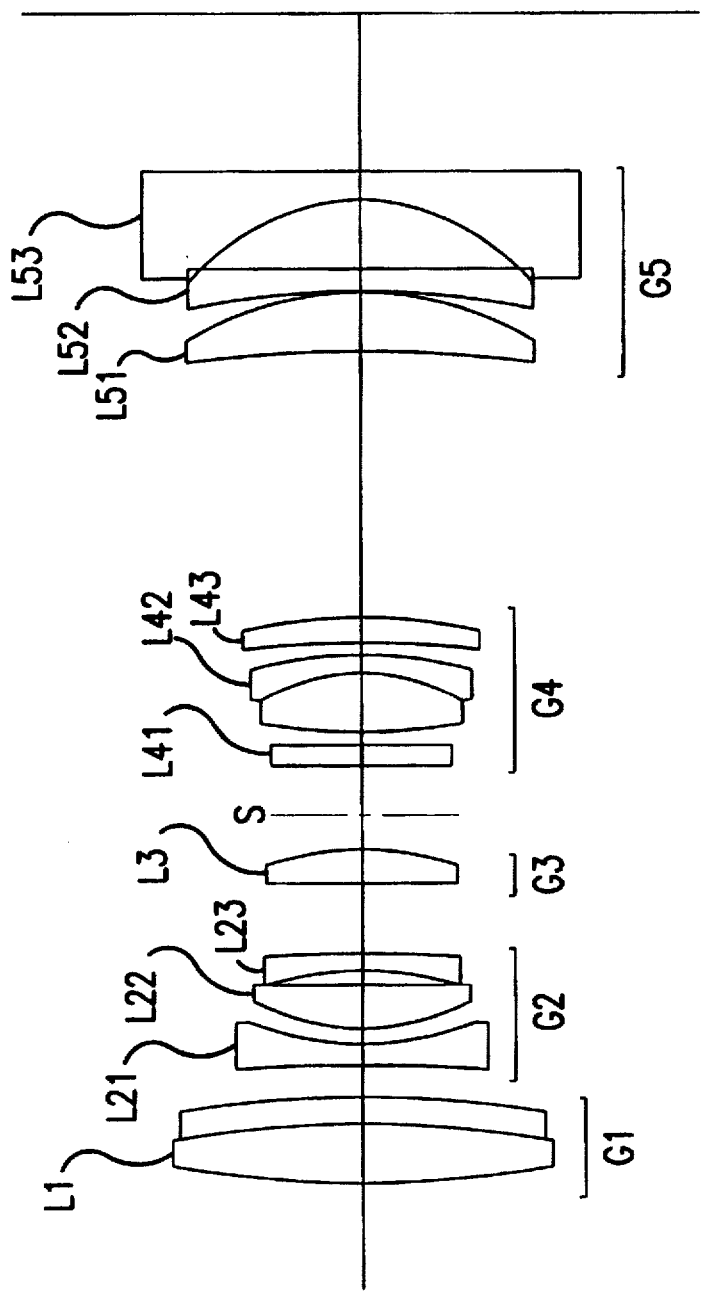
FIG. 5 is a drawing that shows the structure of a zoom lens system that pertains to the first embodiment of this invention.

FIG. 5 is a drawing that shows the lens structure of the zoom lens system that pertains to the first embodiment of this invention.

The zoom lens system of FIG. 5 comprises, in order from the object side, a first lens unit G1 having a compound lens L1 with a biconvex lens and a negative meniscus lens with a concave surface facing the object side; a second lens unit G2 having a biconcave lens L21, a biconvex lens L22, and a negative meniscus lens L23 with a concave surface facing the object side; a third lens unit G3 having a positive meniscus lens L3 with a concave surface facing the object side; a fourth lens unit G4 having a negative meniscus lens L41 with a convex surface facing the object side, a compound positive lens L42 with a biconvex lens and a negative meniscus lens with a concave surface facing the object side, and a positive meniscus lens L43 with a concave surface facing the object side; and a fifth lens unit G5 having a positive meniscus lens L51 with a concave surface facing the object side, a negative meniscus lens L52 with a concave surface facing the object side, and a biconcave lens L53.

An aperture stop S is positioned between the third lens unit G3 and the fourth lens unit G4 and moves as a one unit with the fourth lens unit G4 when the magnification changes from the maximum wide angle state to the maximum telephoto state.

FIG. 5 shows the relative positions of each lens unit at the maximum wide angle state. When the magnification is changed to at or near the maximum telephoto state, the lenses move along the zooming focus shown by the arrows in FIG. 4 on the optical axis.

In addition, the compound positive lens L42 within the fourth lens unit G4 is moved in a direction substantially perpendicular to the optical axis, shifting the image and compensating the change in the image position resulting from camera shaking and the like. As shown in the above-mentioned FIG. 51, the compound positive lens L42 moves from a position on the optical axis to a position outside the optical axis along an arc-shaped path through the rotation of the supporting arms about the support points.

Furthermore, in addition to the third lens unit G3 being moved along the optical axis toward the object side to focus on a close-range object, the third lens unit G3 is moved along the optical axis and compensates the back focus variations that occur when the image is shifted.

The values of the items of the first embodiment of this invention are displayed in the following Table (1). In Table (1), f indicates the focal length, FNO indicates the F-number, 2ω (omega) indicates the field angle, and Bf indicates the back focus. The surface numbers indicate the order of the lens surfaces from the object side, which is the direction from which the light rays proceed, and the index of refraction and the Abbe number each indicate values for the d-line (λ(lambda)=587.6 nm).

TABLE 1 f = 38.81--75.31--146.92 mm
FNO = 3.96--6.38--9.70
2ω = 58.12--30.96--16.26°

| surface number | radius of curvature | space between surfaces | Abbe number | index of refraction |
|---|---|---|---|---|
| 1 | 76.2241 | 4.019 | 69.98 | 1.51860 |
| 2 | -47.4746 | 1.381 | 23.01 | 1.86074 |
| 3 | -76.6896 | (d3 = variable) | | |
| 4 | -53.5482 | 1.130 | 45.37 | 1.79668 |
| 5 | 19.1680 | 0.880 | | |
| 6 | 16.8235 | 2.763 | 25.80 | 1.78472 |
| 7 | -509.2328 | 1.005 | | |
| 8 | -18.6135 | 1.130 | 45.37 | 1.79668 |
| 9 | -86.4849 | (d9 = variable) | | |
| 10 | -556.1586 | 2.135 | 69.98 | 1.51860 |
| 11 | -19.2038 | (d11 = variable) | | |
| 12 | ∞ | 2.260 | (aperture stop) | |
| 13* | 881.8165 | 1.256 | 30.24 | 1.58518 |
| 14 | 138.4036 | 0.628 | | |
| 15 | 30.5374 | 3.767 | 70.41 | 1.48749 |
| 16 | -13.9471 | 1.256 | 23.01 | 1.86074 |
| 17 | -22.5167 | 0.628 | | |
| 18* | -46.0998 | 1.633 | 57.57 | 1.49108 |
| 19 | -33.9488 | (d19 = variable) | | |
| 20 | -81.3711 | 3.391 | 25.35 | 1.80518 |
| 21 | -22.5435 | 0.251 | | |
| 22 | -45.3352 | 1.256 | 43.35 | 1.84042 |
| 23 | -152.1781 | 4.144 | | |
| 24 | -14.9528 | 1.507 | 49.45 | 1.77279 |
| 25 | 1174.6127 | (Bf) | | |

(aspherical surface data)

| | x | $C_2$ | $C_4$ |
|---|---|---|---|
| surface 13 | 1.000 | 0.0000 | $-3.7970 \times 10^{-5}$ |

| $C_6$ | $C_8$ | $C_{10}$ |
|---|---|---|
| $8.7280 \times 10^{-9}$ | $-3.8696 \times 10^{-9}$ | $1.8028 \times 10^{-11}$ |

| | x | $C_2$ | $C_4$ |
|---|---|---|---|
| surface 18 | 1.0000 | 0.0000 | $2.3231 \times 10^{-5}$ |

| $C_6$ | $C_8$ | $C_{10}$ |
|---|---|---|
| $-1.4367 \times 10^{-7}$ | $4.9064 \times 10^{-9}$ | $-4.0009 \times 10^{-11}$ |

(variable intervals for changing the focal length of the lens system)

| f | 38.8139 | 75.3083 | 146.9210 |
|---|---|---|---|
| d3 | 2.1349 | 12.8945 | 26.2437 |
| d9 | 4.3709 | 2.6213 | 1.2558 |
| d11 | 2.5361 | 4.2857 | 5.6512 |
| d19 | 16.9404 | 8.9927 | 2.7628 |
| Bf | 9.3026 | 31.4511 | 65.2447 |

(movement amount of lens component L42 when image is shifted 0.01 (rad))

| f | 38.8139 | 75.3083 | 146.9210 |
|---|---|---|---|
| lens movement amount | 0.3141 | 0.3780 | 0.4893 |
| image shift amount | 0.3881 | 0.7531 | 1.4692 |

(focusing movement amount of third lens unit G3 when the photographic magnification is -1/40)

| f | 38.8139 | 75.3083 | 146.9210 |
|---|---|---|---|
| movement amount | 0.8082 | 0.6045 | 0.5653 |

The movement direction facing from the object side to the image surface is positive.

(back focus variation amount when the third lens unit G3 has moved 0.03 mm)

| f | 38.8139 | 75.3083 | 146.9210 |
|---|---|---|---|
| variation amount | 0.0360 | 0.0933 | 0.1947 |

The third lens unit G3 moves toward the image side, and the back focus is positive in the direction that the light rays proceed.

(back focus variation amount when the lens component L42 has moved 0.03 mm)

| f | 38.8139 | 75.3083 | 146.9210 |
|---|---|---|---|
| variation amount | -0.0408 | -0.1060 | -0.2686 |

The lens component L42 moves toward the object side, and the back focus is positive in the direction that the light rays proceed.

Figure 6:
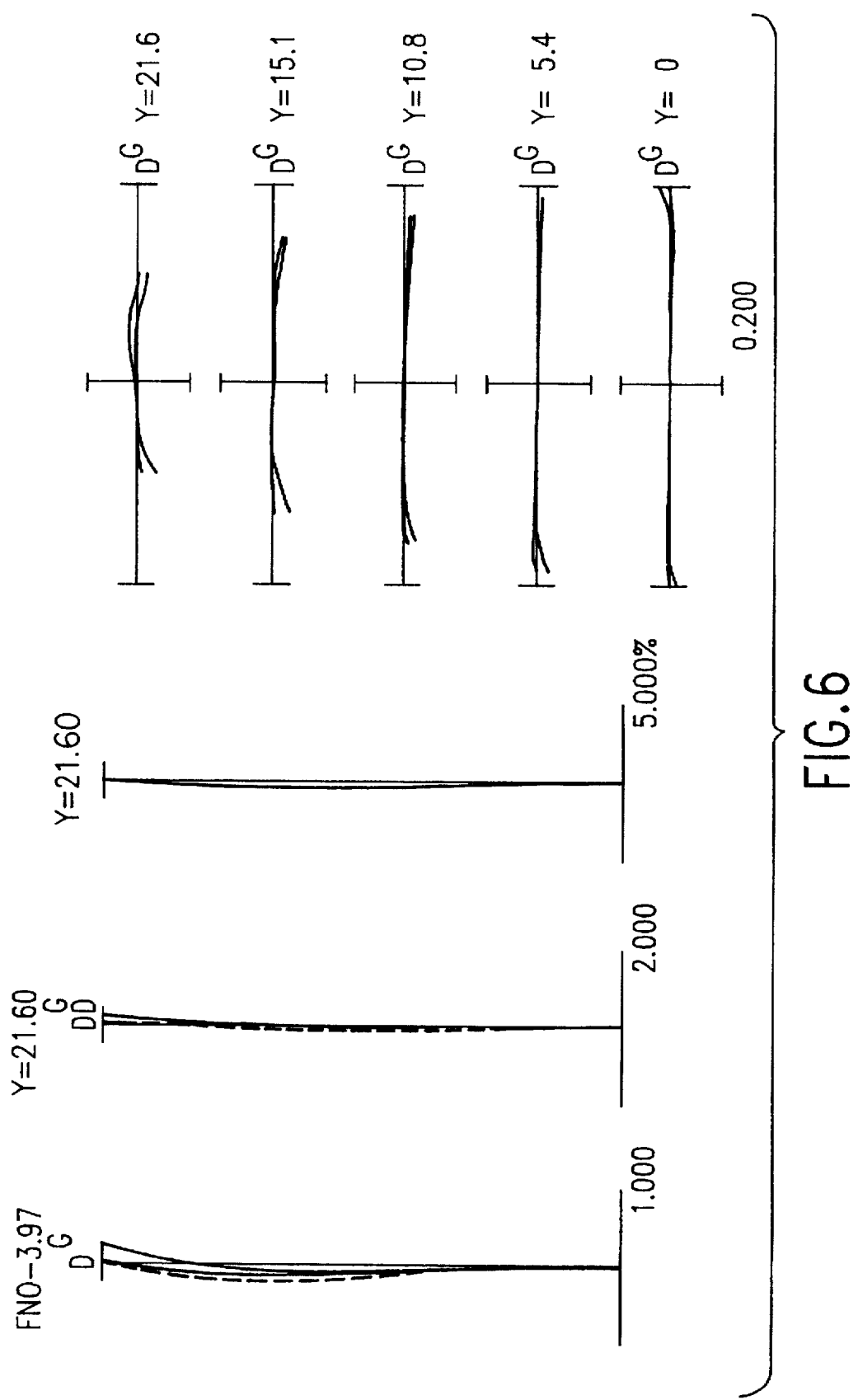
FIG. 6 is a drawing that shows various aberrations at the infinite focus condition at the maximum wide angle state of the first embodiment.
Figure 7:
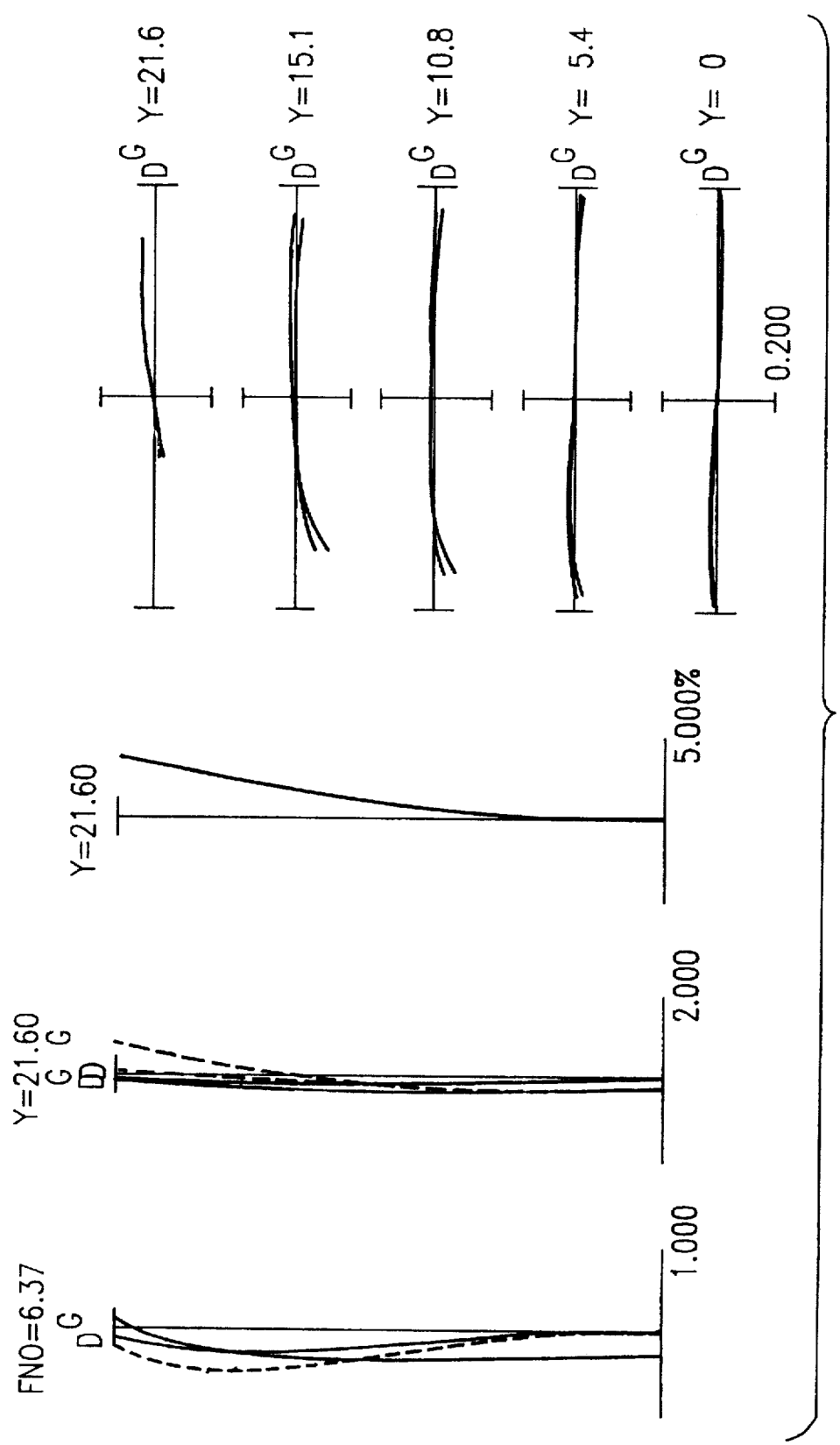
FIG. 7 is a drawing that shows various aberrations at the infinite focus condition at the intermediate focal length of the first embodiment.
Figure 8:
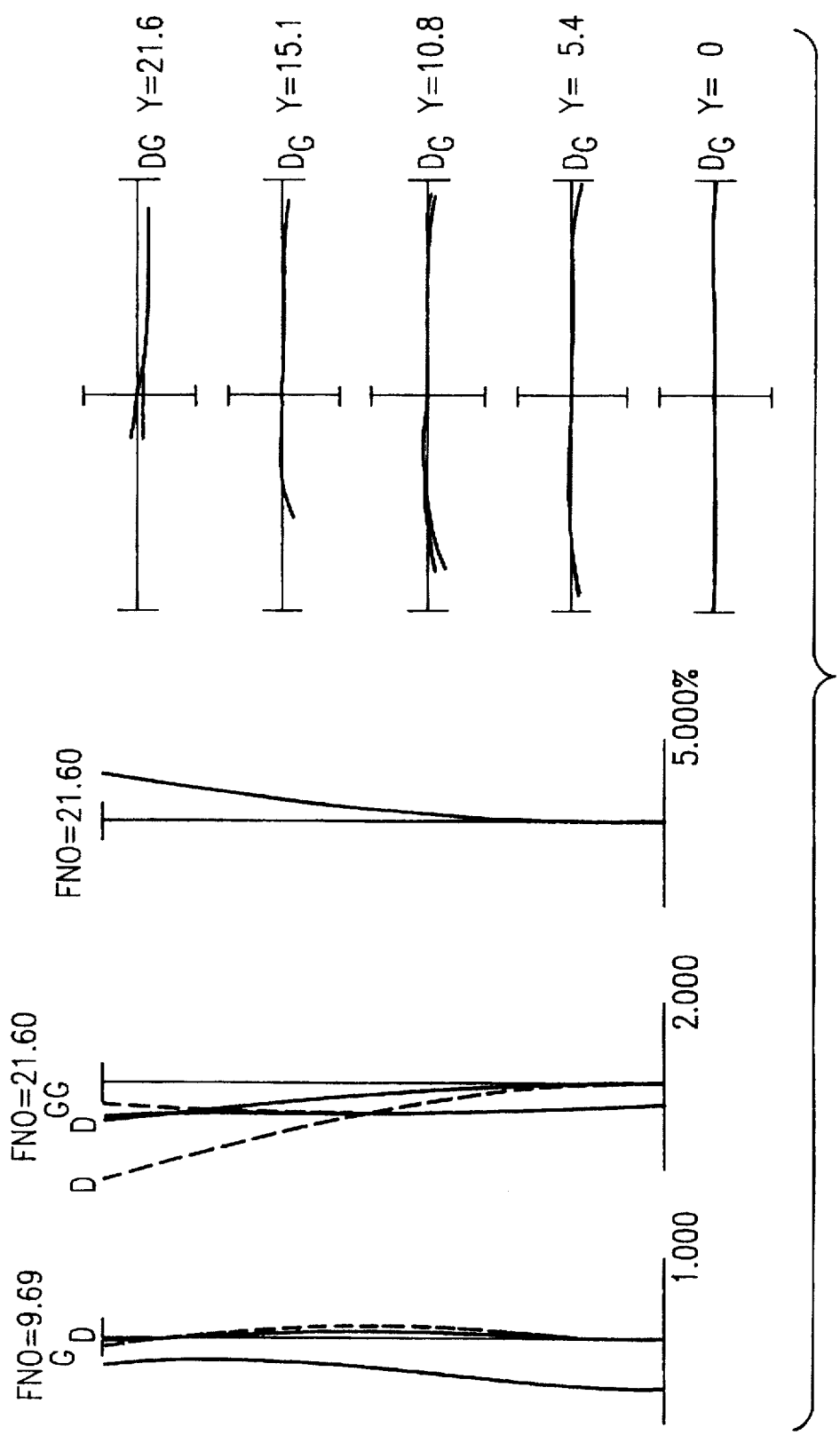
FIG. 8 is a drawing that shows various aberrations at the infinite focus condition at the maximum telephoto state of the first embodiment.

FIGS. 6-11 are drawings that show the various aberration diagrams for the first embodiment. FIG. 6 is a drawing that shows the various aberrations at the infinite focus state at the maximum wide angle state; FIG. 7 shows the various aberrations at the infinite focus condition at the intermediate focal length condition; and FIG. 8 shows the aberrations at the infinite focus condition at the maximum telephoto state.

Figure 9:
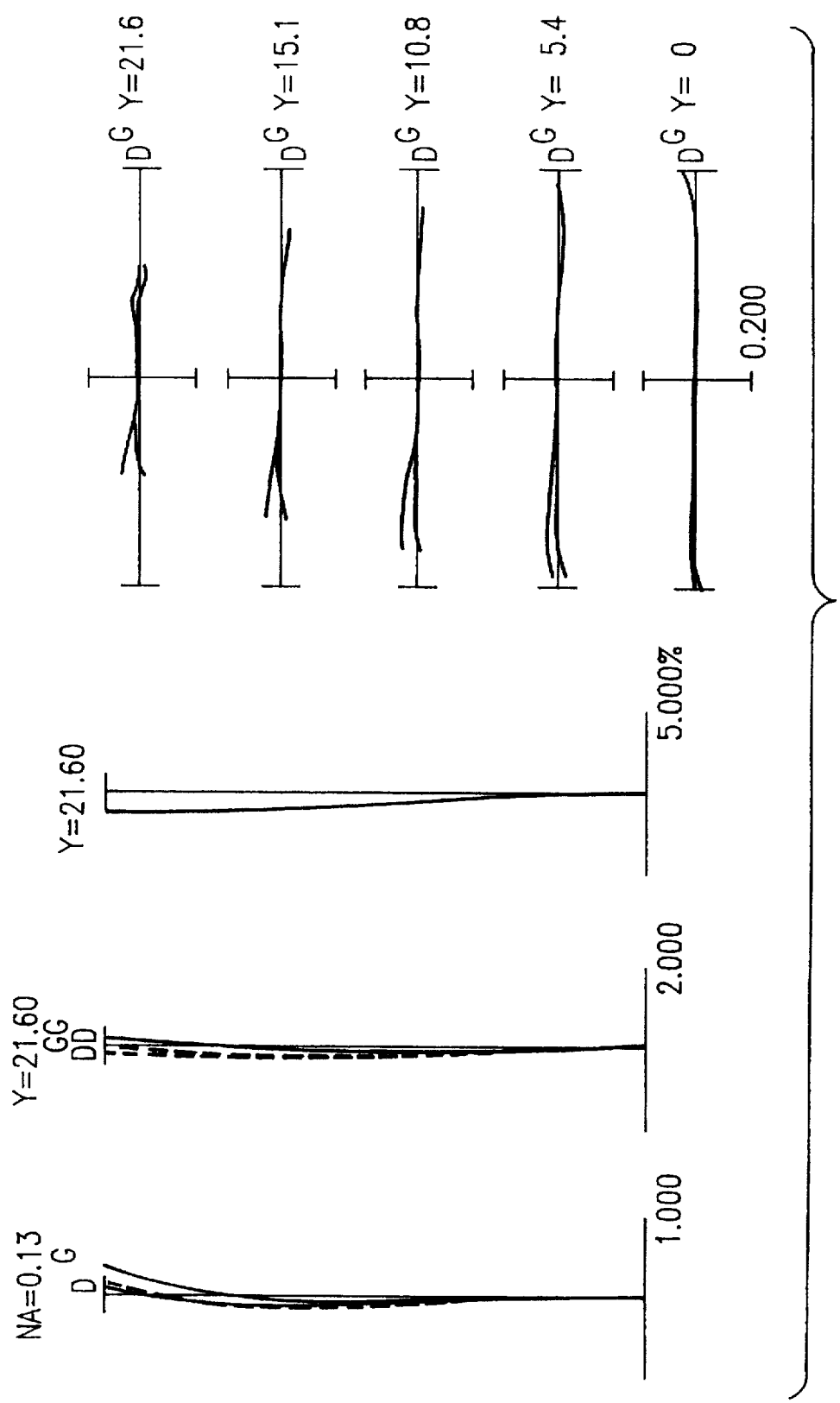
FIG. 9 is a drawing that shows various aberration diagrams at a photographic magnification of $-1/40$ at the maximum wide angle state of the first embodiment.
Figure 10:
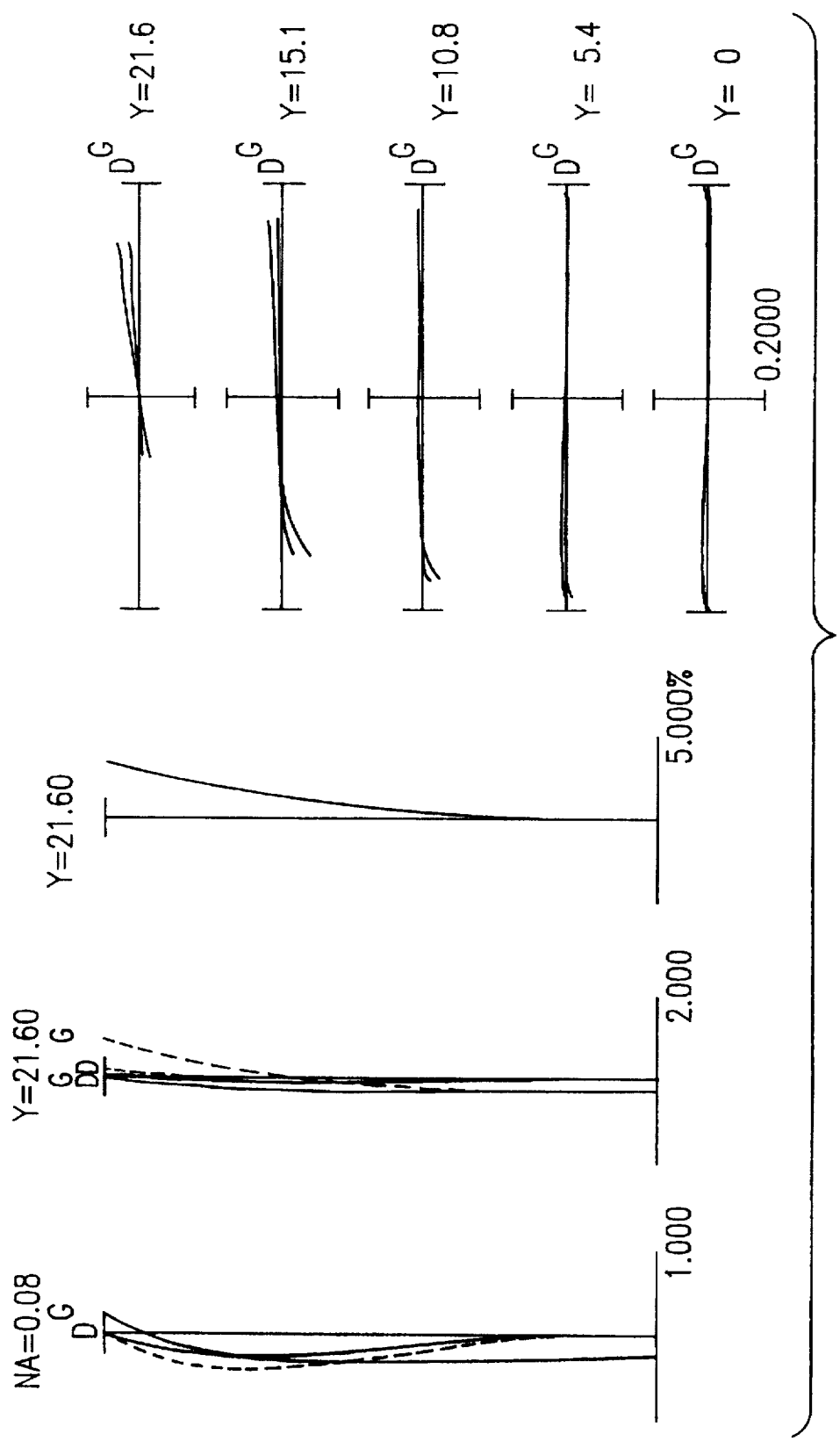
FIG. 10 is a drawing that shows various aberrations at a photographic magnification of $-1/40$ at the intermediate focal length of the first embodiment.
Figure 11:
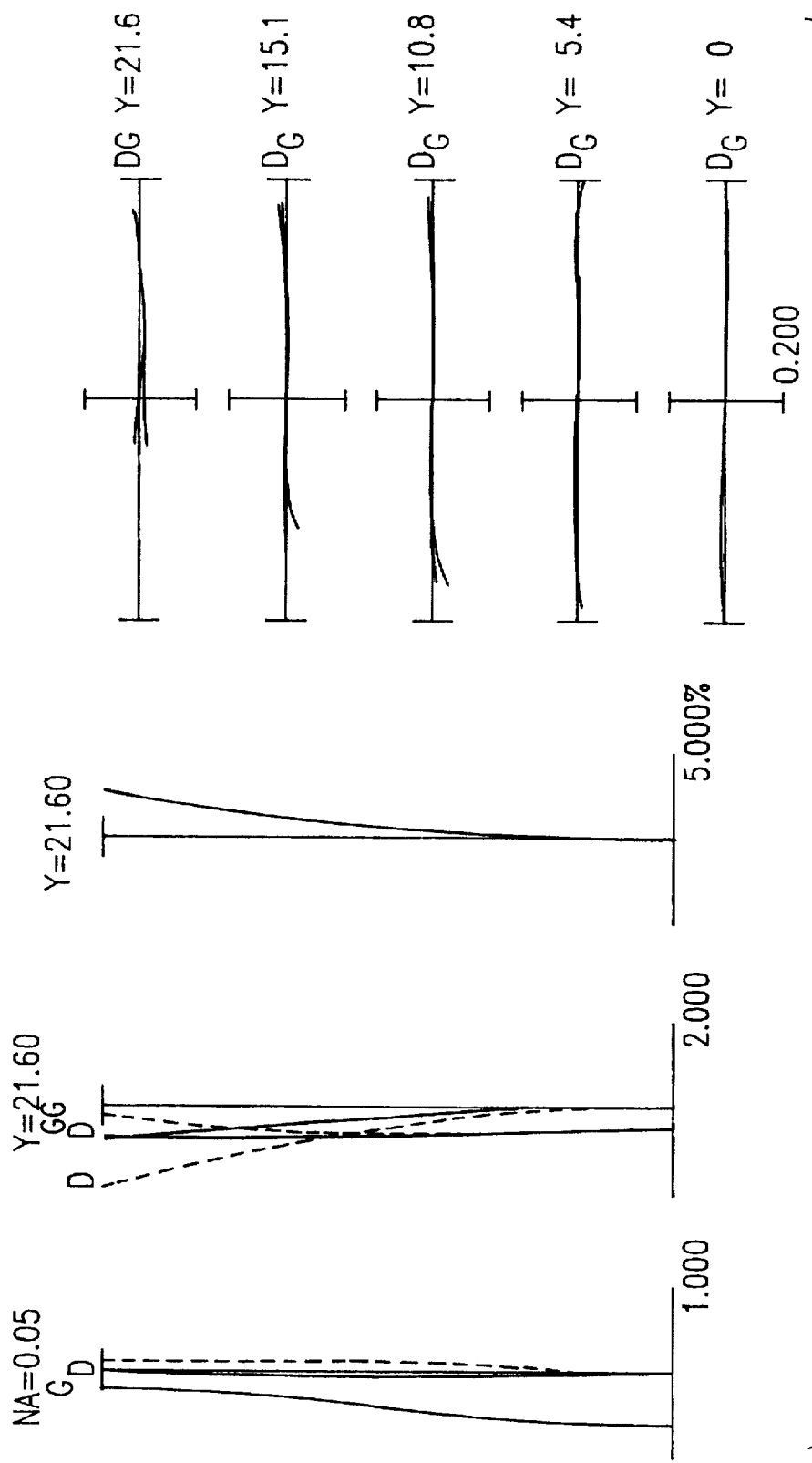
FIG. 11 is a drawing that shows various aberrations at a photographic magnification of $-1/40$ at the maximum telephoto state of the first embodiment.

FIG. 9 is a drawing that shows the aberration diagrams at a photographic magnification of -1/40 at the maximum wide angle state; FIG. 10 shows the aberrations at a photographic magnification of -1/40 at the intermediate focal length condition; and FIG. 11 shows the aberrations at a photographic magnification of -1/40 at the maximum telephoto state.

Figure 12:
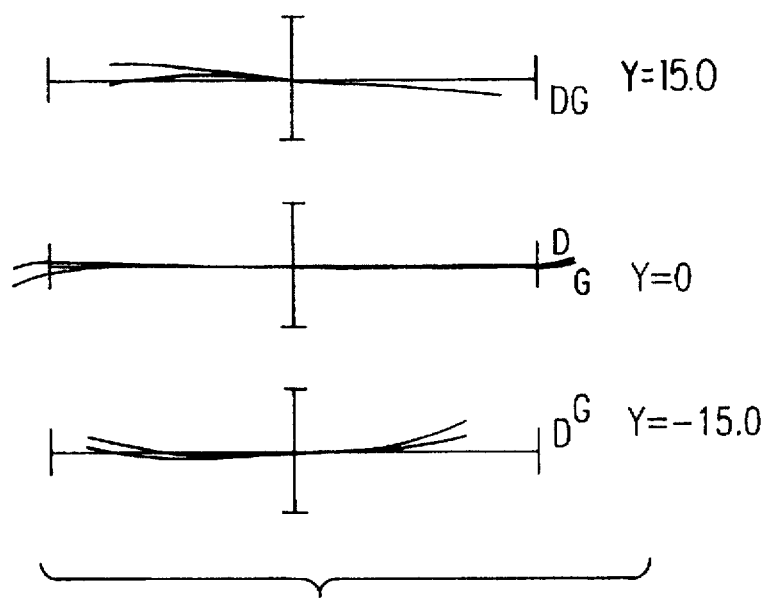
FIG. 12 is a drawing that shows the coma aberrations at the infinite focus condition at the maximum wide angle state of the first embodiment when the image is shifted.
Figure 13:
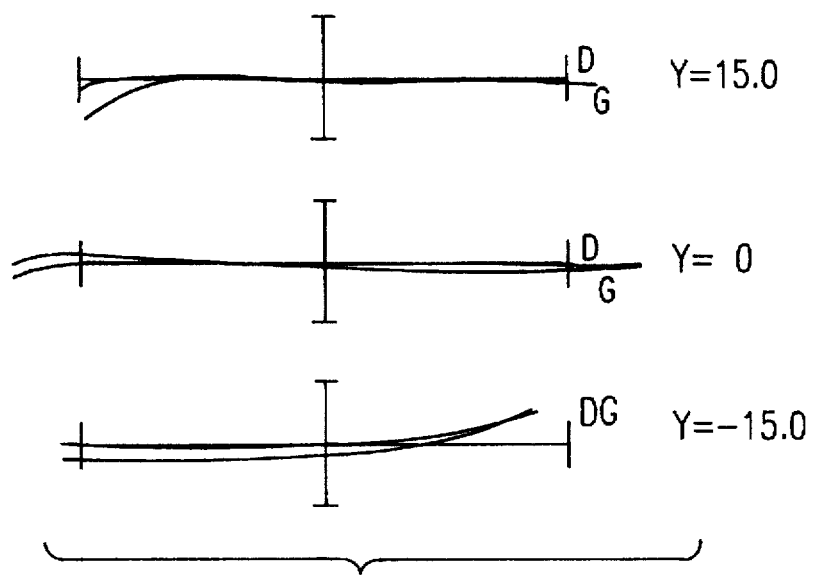
FIG. 13 is a drawing that shows the coma aberrations at the infinite focus condition at the intermediate focal length of the first embodiment when the image is shifted.
Figure 14:
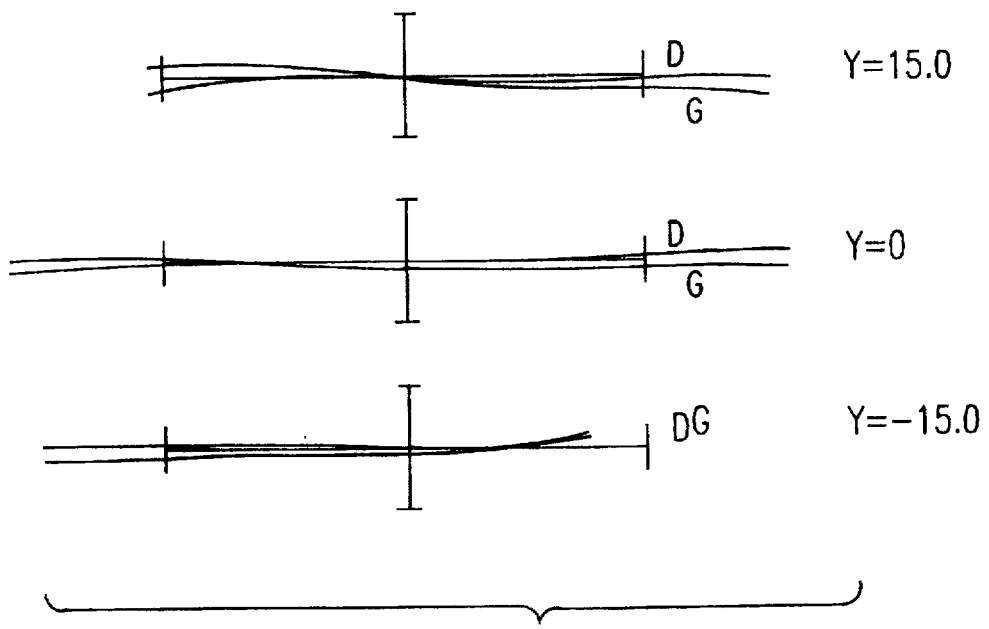
FIG. 14 is a drawing that shows the coma aberrations at the infinite focus condition at the maximum telephoto state of the first embodiment when the image is shifted.
Figure 15:
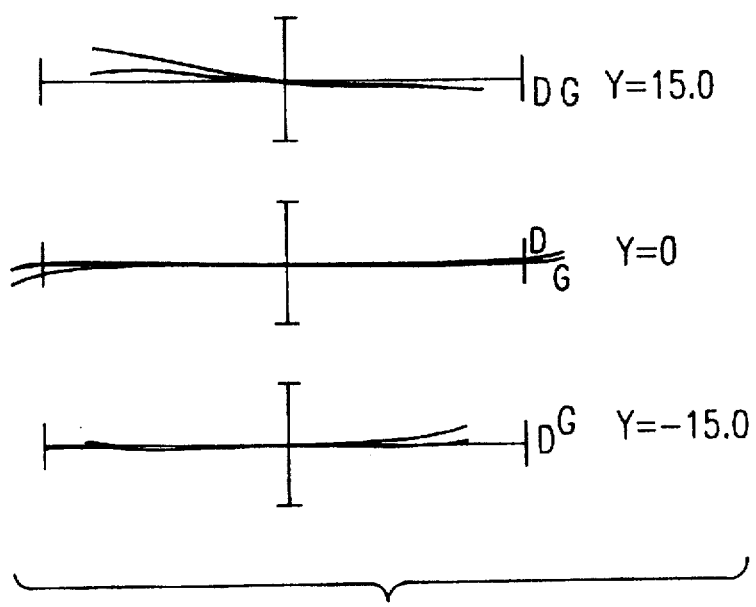
FIG. 15 is a drawing that shows the coma aberrations at a photographic magnification of $-1/40$ at the maximum wide angle state of the first embodiment when the image is shifted.
Figure 16:
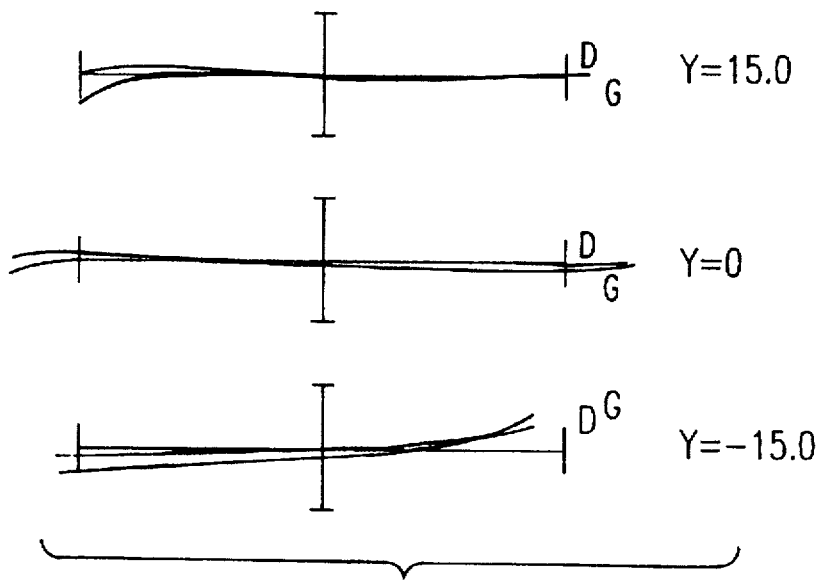
FIG. 16 is a drawing that shows the coma aberrations at a photographic magnification of $-1/40$ at the intermediate focal length of the first embodiment when the image is shifted.
Figure 17:
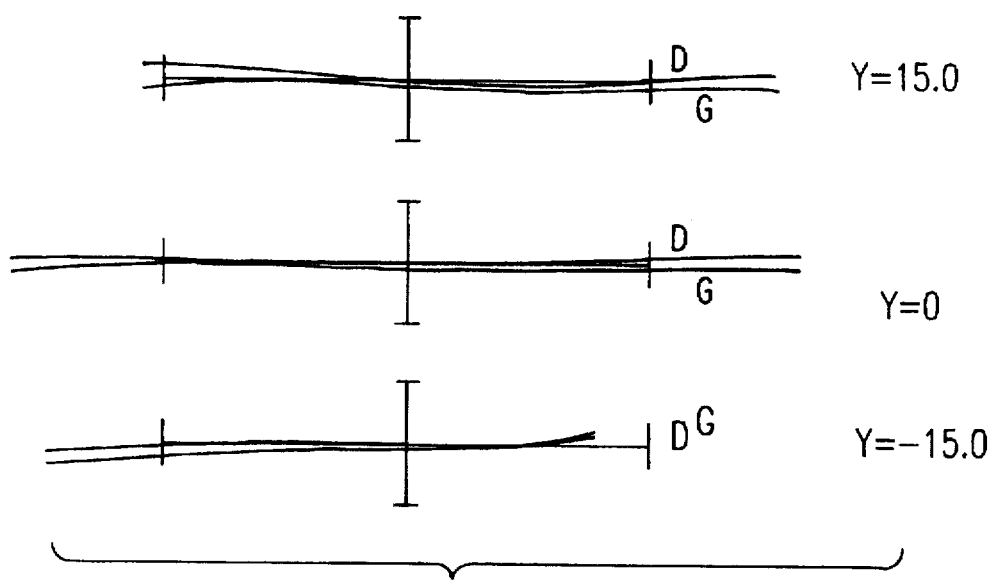
FIG. 17 is a drawing that shows the coma aberrations at a photographic magnification of $-1/40$ at the maximum telephoto state of the first embodiment when the image is shifted.

FIGS. 12-17 are coma aberration diagrams that show the coma aberrations when the image is shifted 0.01 rad (radians) with respect to the optical axis in the first embodiment. FIG. 12 shows the coma aberrations at the infinite focus condition at the maximum wide angle state; FIG. 13 shows the coma aberrations at the infinite focus condition at the intermediate focal length condition; and FIG. 14 shows the coma aberrations at the infinite focus condition at the maximum telephoto state. FIG. 15 shows the coma aberrations at a photographic magnification of -1/40 at the maximum wide angle state; FIG. 16 shows the coma aberrations at a photographic magnification of -1/40 at the intermediate focal length condition; and FIG. 17 shows the coma aberrations at a photographic magnification of -1/40 at the maximum telephoto state.

In each aberration diagram, FN0 indicates the F-number, NA indicates the aperture number, Y indicates the height of the image, D indicates the d-line (λ=587.6 nm), and G indicates the g-line (λ=453.8 nm).

On the aberration diagrams that show the astigmatism aberrations, the solid lines show the sagittal image surfaces, and the dashed lines show the meridional image surfaces. On the aberration diagrams that show the spherical aberrations, the dashed lines show the sine condition.

Each aberration diagram in FIGS. 12-17 shows coma aberrations at Y=15.0, 0, and -15.0 when the lens component L42 is moved in the positive direction for the image height Y.

As is evident on each aberration diagram, with the present embodiment, the various aberrations are properly corrected even when the image is shifted at each focus focal length condition and at each photographic focal length condition.

The optical performance for the case in which the image was shifted 0.01 (rad) with respect to the optical axis on the first and second embodiments was shown as an example, but a sufficient optical performance can also be obtained for larger shifting amounts using this invention.

Figure 18:
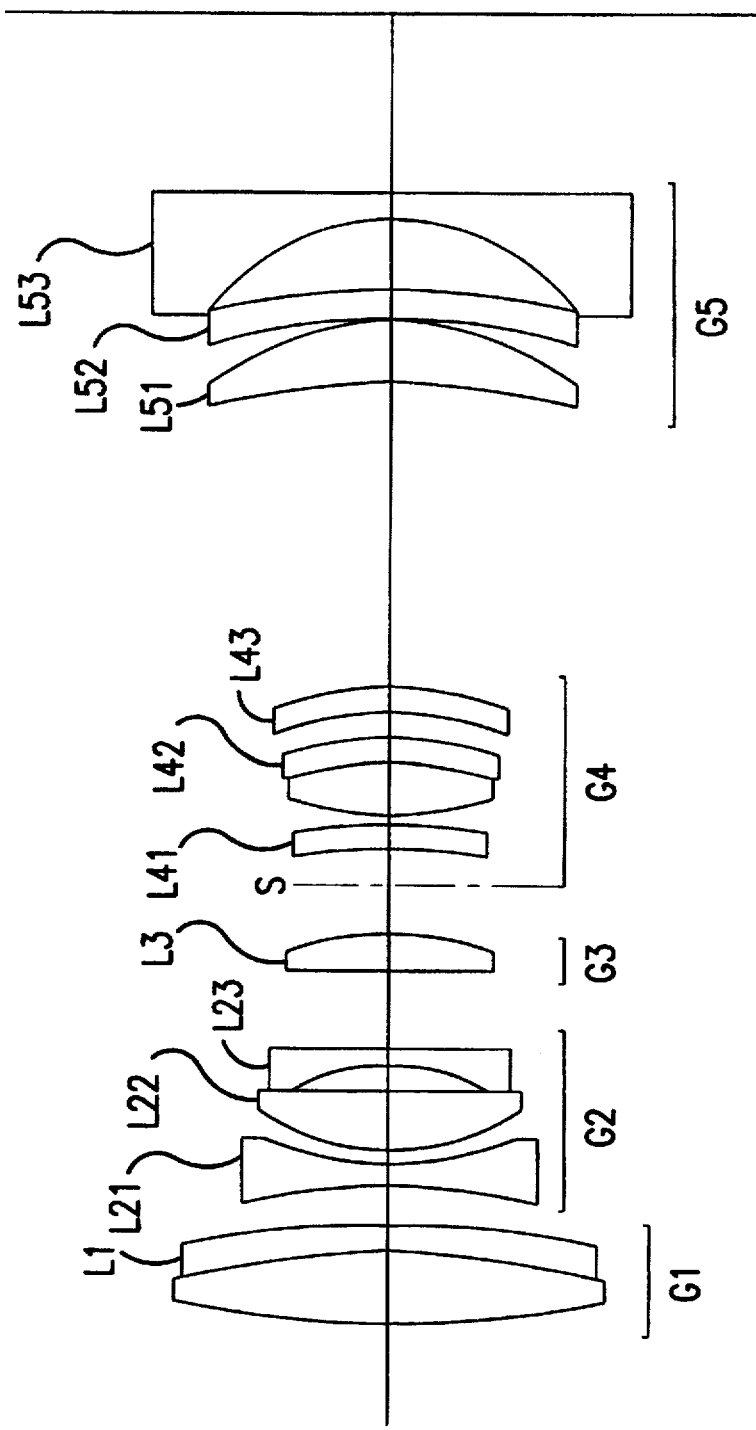
FIG. 18 is a drawing that shows the structure of a zoom lens system that pertains to the second embodiment of this invention.

FIG. 18 is a drawing that shows the lens structure of the zoom lens system that pertains to the second embodiment of this invention.

The zoom lens system of FIG. 18 comprises, in order from the object side, a first lens unit G1 having a compound lens L1 with a biconvex lens and a negative meniscus lens with a concave surface facing the object side; a second lens unit G2 having a biconcave lens L21, a biconvex lens L22, and a negative meniscus lens L23 with a concave surface facing the object side; a third lens unit G3 having a positive meniscus lens L3 with a concave surface facing the object side; a fourth lens unit G4 having a negative meniscus lens L41 with a concave surface facing the object side, a compound positive lens L42 with a biconvex lens and a negative meniscus lens with a concave surface facing the object side, and a positive meniscus lens L43 with a concave surface facing the object side; and a fifth lens unit G5 having a positive meniscus lens L51 with a concave surface facing the object side, a negative meniscus lens L52 with a concave surface facing the object side, and a negative meniscus lens L53 with a concave surface facing the object side.

An aperture stop S is positioned between the third lens unit G3 and the fourth lens unit G4 and moves as a one unit with the fourth lens unit G4 when the magnification changes from the maximum wide angle state to the maximum telephoto state.

FIG. 18 shows the relative positions of each lens unit at the maximum wide angle state. When the magnification is changed to at or near the maximum telephoto state, the lenses move along the zooming focus shown by the arrows in FIG. 3 on the optical axis.

In addition, the compound positive lens L42 within the fourth lens unit G4 is moved in a direction substantially perpendicular to the optical axis, shifting the image and compensating the change in the image position resulting from camera shaking and the like. As shown in the above-mentioned FIG. 51, the compound positive lens L42 moves from a position on the optical axis to a position outside the optical axis along an arc-shaped path through the rotation of the supporting arms about the support points.

Furthermore, in addition to the third lens unit G3 being moved along the optical axis toward the image side to focus a close-range object, the third lens unit G3 is moved along the optical axis and compensates the back focus variations that occur when the image is shifted.

The values of the items of the second embodiment of this invention are displayed in the following Table (2). In Table (2), f indicates the focal length, FN0 indicates the F-number, $2\overline{\omega}$ indicates the field angle, and Bf indicates the back focus. The surface numbers indicate the order of the lens surfaces from the object side, which is the direction from which the light rays proceed, and the index of refraction and the Abbe number each indicate values for the d-line ($\lambda$=587.6 nm).

The aperture ratios at the infinite focus condition and the close-range focus condition are defined by the F-number (FN0) and the image side aperture number (NA), respectively.

The aspherical surfaces are expressed by the following formula (i), where y is the height in a direction perpendicular to the optical axis, S(y) is the position shifting amount along the optical axis at height y, R is the standard radius of curvature (the radius of the apex curvature), k is the conical coefficient, and Cn is the aspherical coefficient at n.

$$S(y)=(y^2/R)/(1+(1-k*y^2/R^2)^{1/2})+C_2*y^2+C_4*y^4+C_6*y^6+C_8*y^8+C_{10}*y^{10}+ \quad (i)$$

In addition, the radius of curvature r of the aspherical surface is defined by the following formula (j).

$$r=1/(2*C_2+1/R) \quad (j)$$

A * is shown at the right of the surface number for each aspherical surface in the tables below for each embodiment.

TABLE 2 f = 38.80–75.35–146.93 mm
FNO = 4.00–6.36–9.70
2ω = 58.70–30.92–16.27°

| surface number | radius of curvature | space between surfaces | Abbe number | index of refraction |
|---|---|---|---|---|
| 1 | 73.1332 | 4.019 | 69.98 | 1.51860 |
| 2 | –46.6612 | 1.381 | 23.01 | 1.86074 |
| 3 | –75.0467 | (d3 = variable) | | |
| 4 | –42.2187 | 1.130 | 45.37 | 1.79668 |
| 5 | 21.9169 | 0.880 | | |
| 6 | 18.4414 | 3.140 | 25.80 | 1.78472 |
| 7 | –163.2882 | 1.130 | | |
| 8 | –19.9737 | 1.130 | 45.37 | 1.79668 |
| 9 | –130.7137 | (d9 = variable) | | |
| 10 | –382.1379 | 2.135 | 69.98 | 1.51860 |
| 11 | –18.9181 | (d11 = variable) | | |
| 12 | ∞ | 2.260 | (aperture stop) | |
| 13 | –47.6819 | 1.256 | 30.24 | 1.58518 |
| 14 | –62.7907 | 0.628 | | |
| 15 | 25.6916 | 3.140 | 70.41 | 1.48749 |
| 16 | –15.6352 | 1.256 | 23.01 | 1.86074 |
| 17 | –26.6752 | 1.507 | | |
| 18 | –24.2170 | 1.507 | 57.57 | 1.49108 |
| 19 | –20.6574 | (d19 = variable) | | |
| 20 | –50.1110 | 3.265 | 25.35 | 1.80518 |
| 21 | –19.9206 | 0.251 | | |
| 22 | –37.0495 | 1.256 | 43.35 | 1.84042 |
| 23 | –76.7513 | 3.893 | | |
| 24 | –14.3845 | 1.507 | 49.45 | 1.77279 |
| 25 | –460.6413 | (Bf) | | |

(aspherical surface data)

| | k | $C_2$ | $C_4$ |
|---|---|---|---|
| surface 13 | 1.0000 | 0.0000 | $-2.0952 \times 10^{-5}$ |

| $C_6$ | $C_8$ | $C_{10}$ |
|---|---|---|
| $-2.2066 \times 10^{-7}$ | $3.5334 \times 10^{-9}$ | $-5.2491 \times 10^{-11}$ |

(variable intervals at changing of magnification)

| | | | |
|---|---|---|---|
| f | 38.8048 | 75.3492 | 146.9313 |
| d3 | 2.1349 | 12.7708 | 25.6207 |
| d9 | 4.3329 | 2.6219 | 1.2558 |
| d11 | 2.5741 | 4.6251 | 5.6512 |
| d19 | 16.5467 | 9.0592 | 2.5116 |
| Bf | 9.4386 | 30.9864 | 65.9288 |

(movement amount of lens component L42 when image is shifted 0.01 (rad))

| | | | |
|---|---|---|---|
| f | 38.8048 | 75.3492 | 146.9313 |
| lens movement amount | 0.3144 | 0.3846 | 0.4938 |
| image shift amount | 0.3881 | 0.7534 | 1.4691 |

(focusing movement amount of third lens unit G3 when the photographic magnification is –1/30)

| | | | |
|---|---|---|---|
| f | 38.8048 | 75.3492 | 146.9313 |
| movement amount | 1.1122 | 0.8498 | 0.8125 |

The movement direction facing from the object side to the image surface is positive.

(variation amounts of Bf and spherical aberration when the component L42 has moved in the optical axis direction)

| | | | |
|---|---|---|---|
| f | 38.8048 | 75.3492 | 146.9313 |
| Bf variation amount | –0.0439 | –0.1107 | –0.2873 |
| spherical aberration variation amount | 0.0055 | 0.0137 | 0.0380 |

The back focus variation amount ΔBf and the spherical aberration variation amount ΔSA indicate the variation amounts that occur when the lens component L42 has moved 0.03 mm. Movement is positive in the direction of the object side.

TABLE 2-continued (values corresponding to conditions)

fb = 47.367
fa = 36.874
(1) ΔSA/ΔBf = –0.125 (maximum wide angle state)
    ΔSA/ΔBf = –0.124 (intermediate focal length condition)
    ΔSA/ΔBf = –0.127 (maximum telephoto state)
(2) lfb|/ft = 0.322
(3) |fa|/ft = 0.251

(back focus variation amount when
the third lens unit G3 has moved 0.03 mm)

| f | 38.8048 | 75.3492 | 146.9313 |
|---|---|---|---|
| variation amount | 0.0349 | 0.0886 | 0.1810 |

The third lens unit G3 moves toward the object side, and the back focus is positive in the direction that the light rays proceed.

(back focus variation amount when
the lens component L42 has moved 0.03 mm)

| f | 38.8048 | 75.3492 | 146.9313 |
|---|---|---|---|
| variation amount | –0.0439 | –0.1106 | –0.2873 |

The lens component L42 moves toward the image side, and the back focus is positive in the direction that the light rays proceed.

Figure 19:
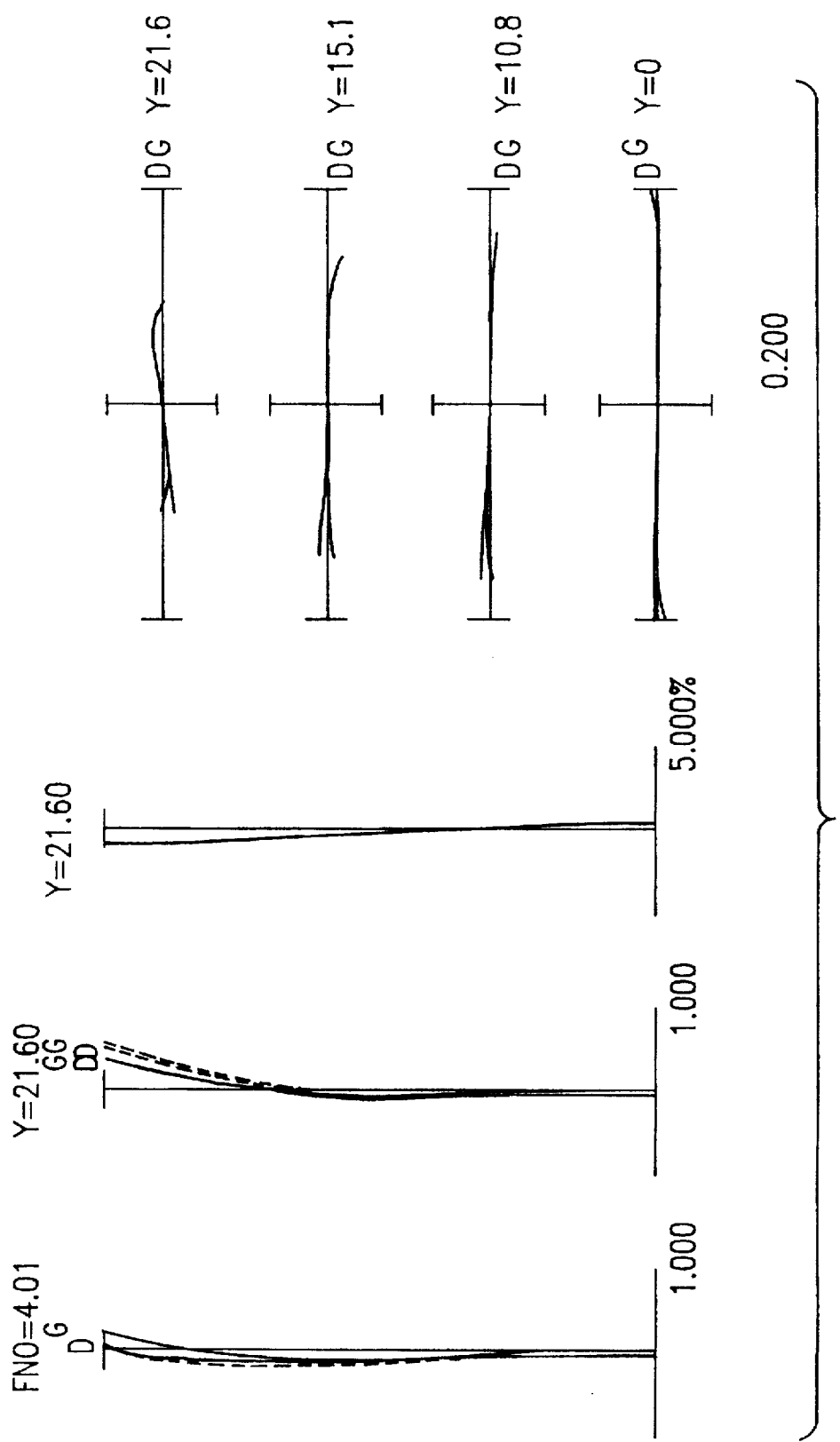
FIG. 19 is a drawing that shows various aberrations at the infinite focus condition at the maximum wide angle state of the second embodiment.
Figure 20:
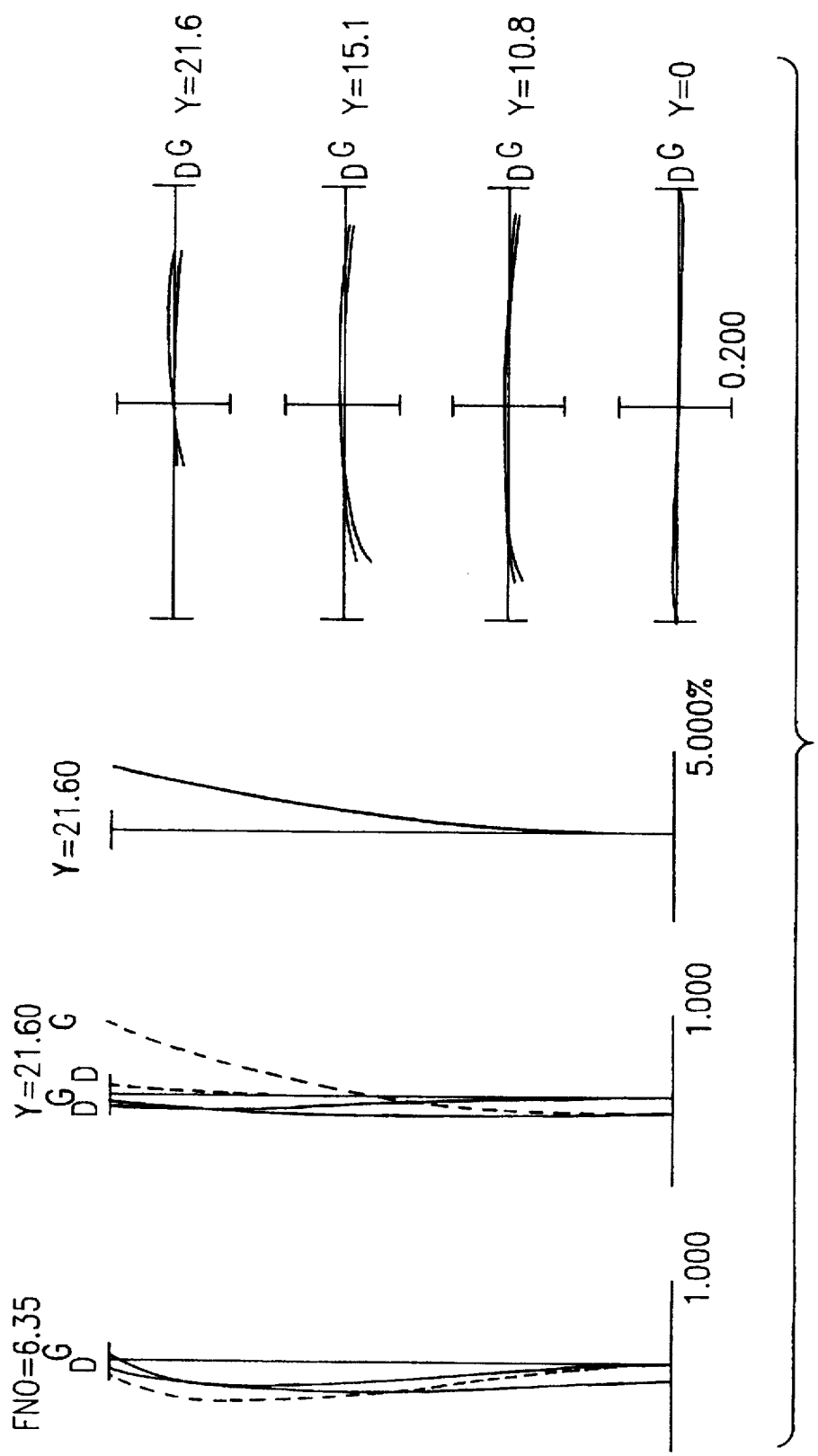
FIG. 20 is a drawing that shows various aberrations at the infinite focus condition at the intermediate focal length of the second embodiment.
Figure 21:
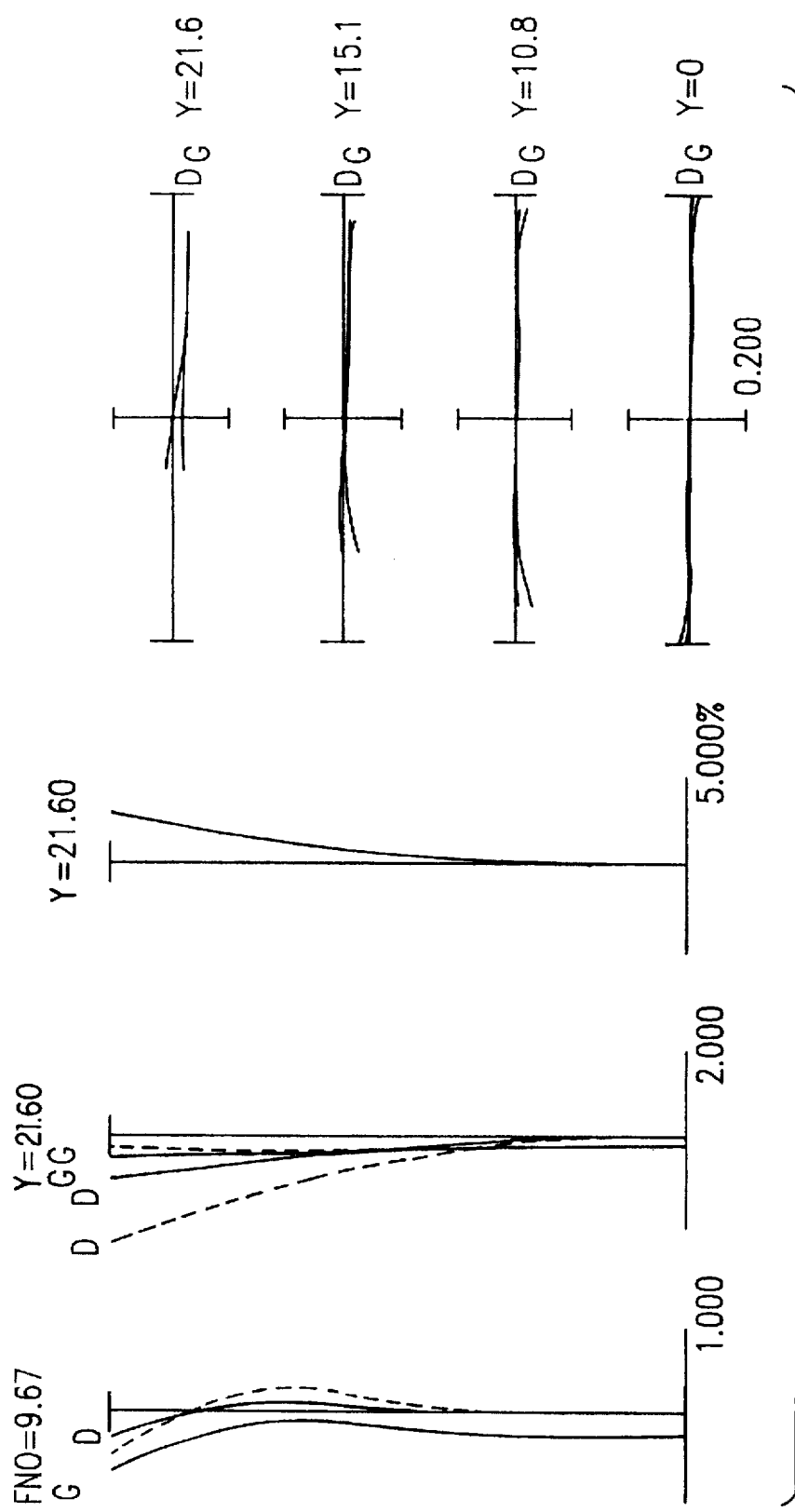
FIG. 21 is a drawing that shows various aberrations at the infinite focus condition at the maximum telephoto state of the second embodiment.

FIGS. 19–24 are drawings that show the various aberration diagrams for the second embodiment. FIG. 19 is a drawing that shows the various aberrations at the infinite focus condition at the maximum wide angle state (the shortest focal length condition); FIG. 20 shows the various aberrations at the infinite focus condition at the intermediate focal length condition; and FIG. 21 shows the aberrations at the infinite focus condition at the maximum telephoto state (the longest focal length condition).

Figure 22:
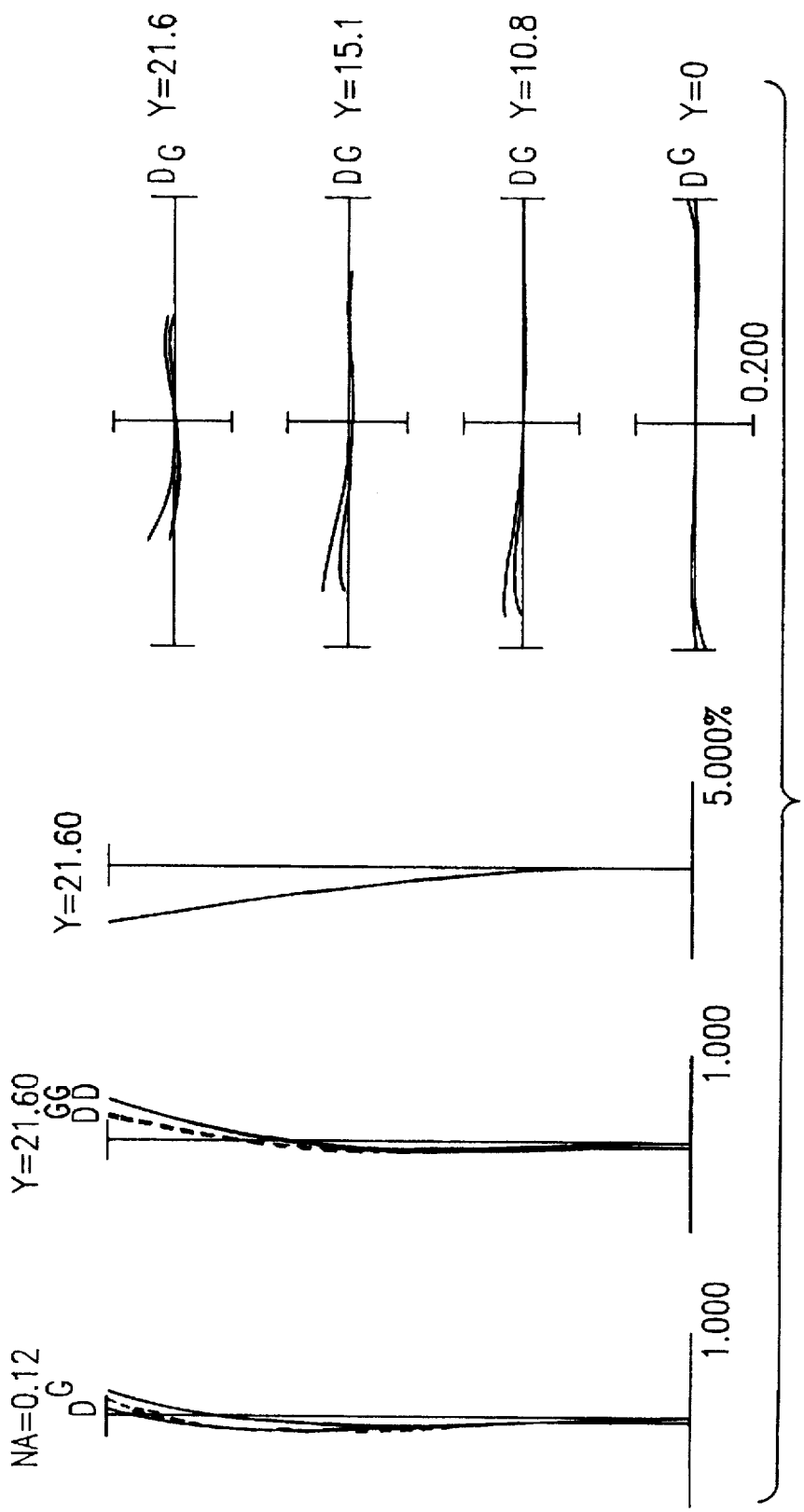
FIG. 22 is a drawing that shows various aberration diagrams at a photographic magnification of $-1/30$ at the maximum wide angle state of the second embodiment.
Figure 23:
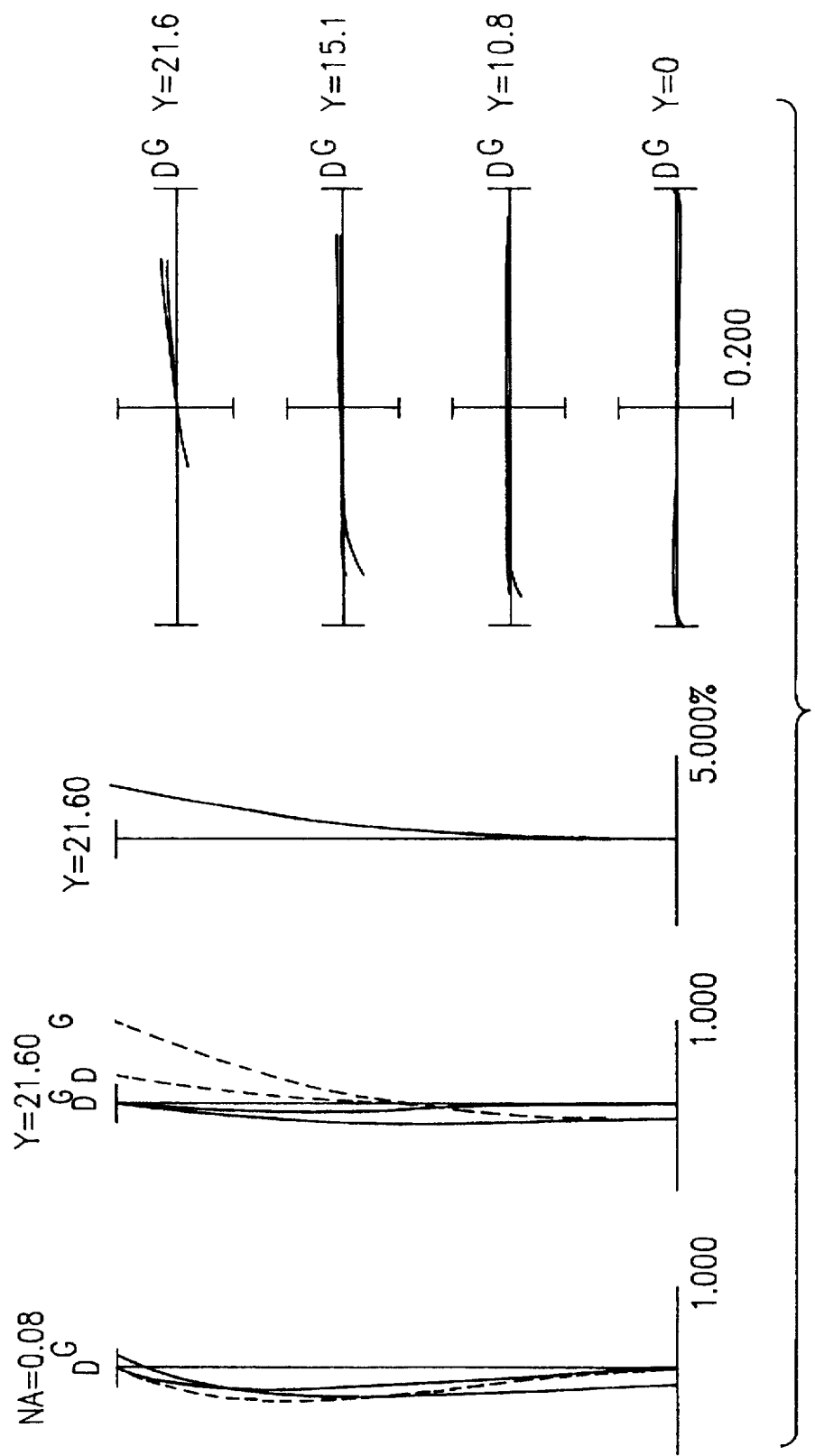
FIG. 23 is a drawing that shows various aberrations at a photographic magnification of $-1/30$ at the intermediate focal length of the second embodiment.
Figure 24:
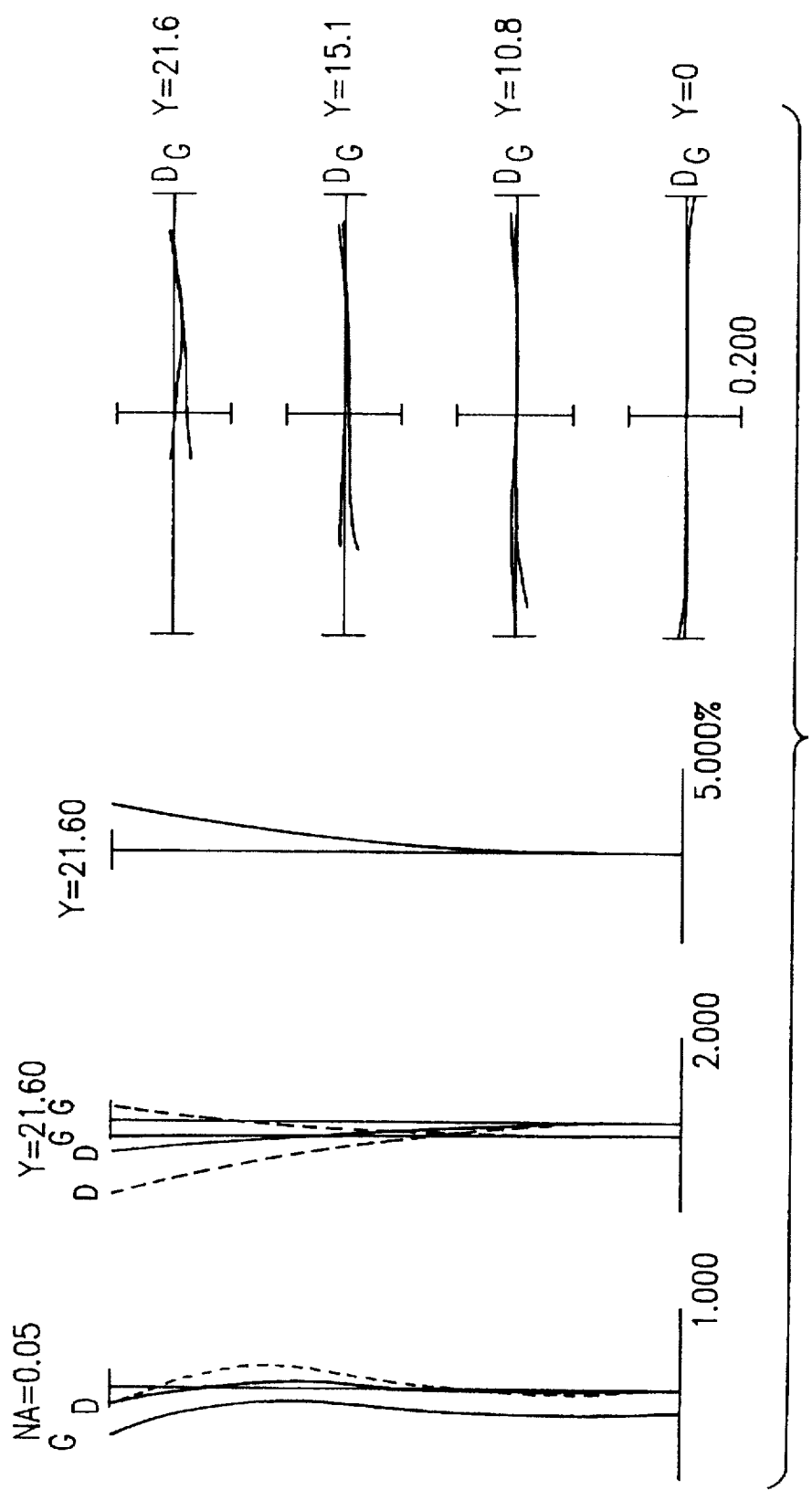
FIG. 24 is a drawing that shows various aberrations at a photographic magnification of $-1/30$ at the maximum telephoto state of the second embodiment.

FIG. 22 is a drawing that shows the aberration diagrams at a photographic magnification of –1/30 at the maximum wide angle state; FIG. 23 shows the aberrations at a photographic magnification of –1/30 at the intermediate focal length condition; and FIG. 24 shows the aberrations at a photographic magnification of –1/30 at the maximum telephoto state.

Figure 25:
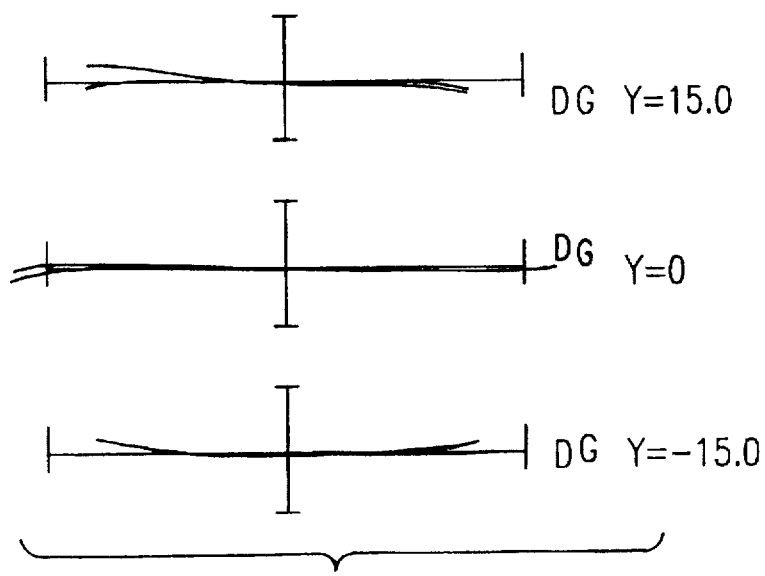
FIG. 25 is a drawing that shows the coma aberrations at the infinite focus condition at the maximum wide angle state of the second embodiment when the image is shifted.
Figure 26:
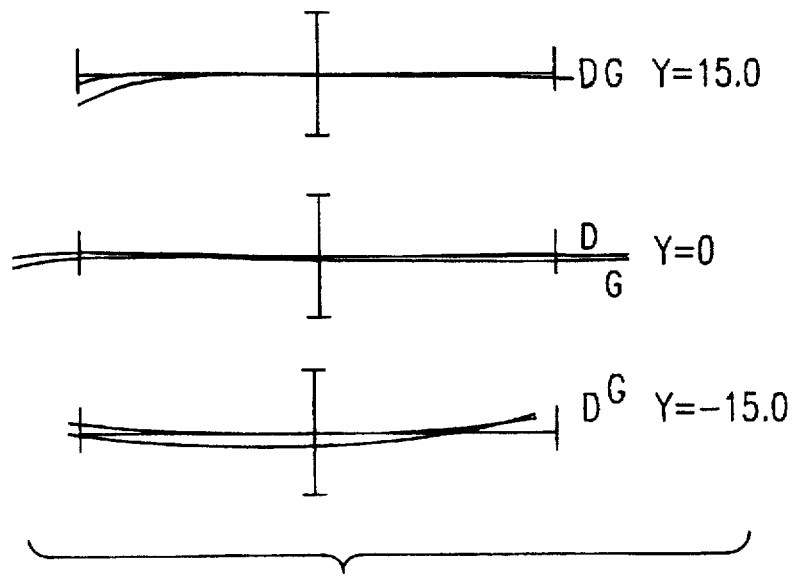
FIG. 26 is a drawing that shows the coma aberrations at the infinite focus condition at the intermediate focal length of the second embodiment when the image is shifted.
Figure 27:
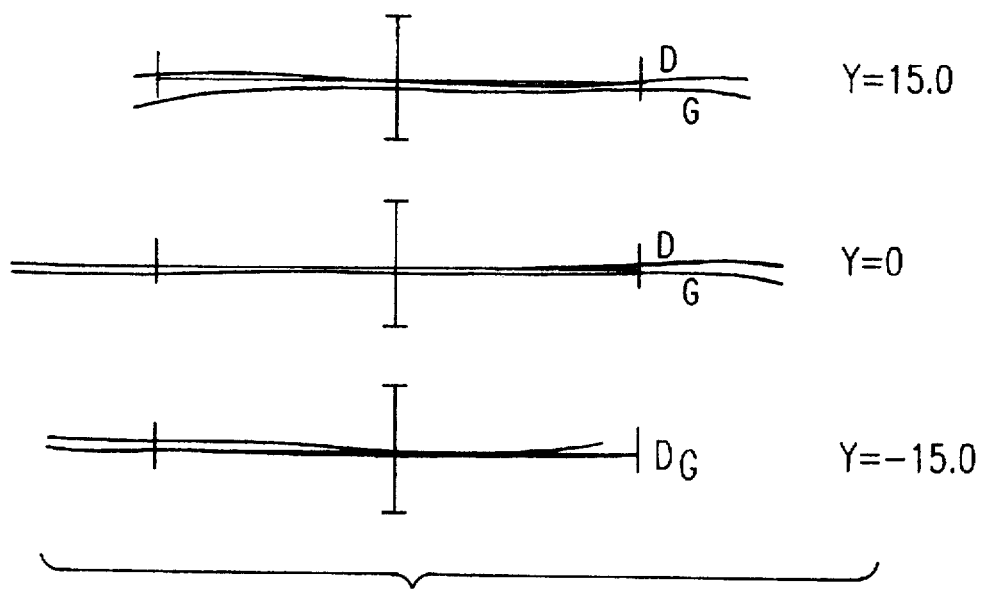
FIG. 27 is a drawing that shows the coma aberrations at the infinite focus condition at the maximum telephoto state of the second embodiment when the image is shifted.
Figure 28:
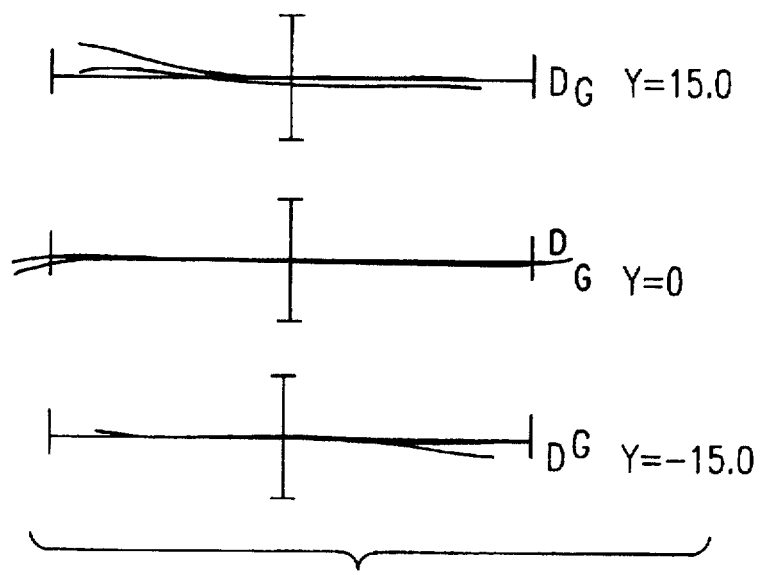
FIG. 28 is a drawing that shows the coma aberrations at a photographic magnification of $-1/30$ at the maximum wide angle state of the second embodiment when the image is shifted.
Figure 29:
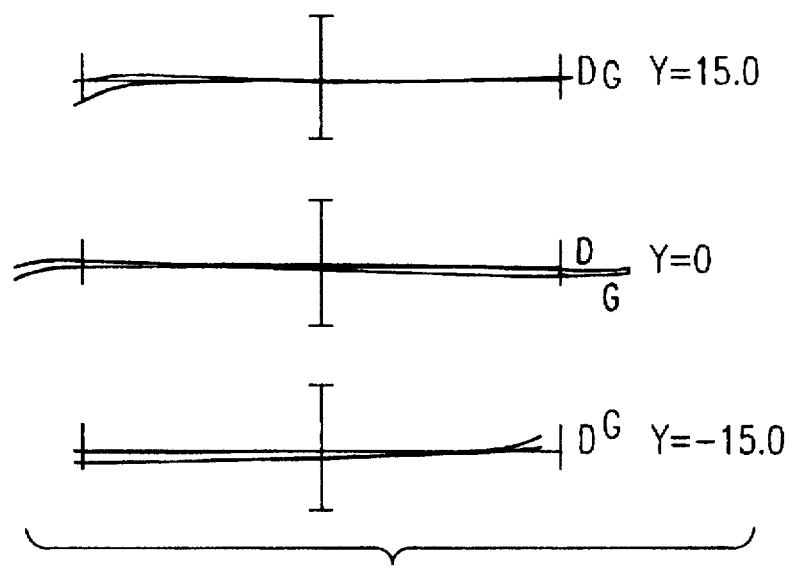
FIG. 29 is a drawing that shows the coma aberrations at a photographic magnification of $-1/30$ at the intermediate focal length of the second embodiment when the image is shifted.
Figure 30:
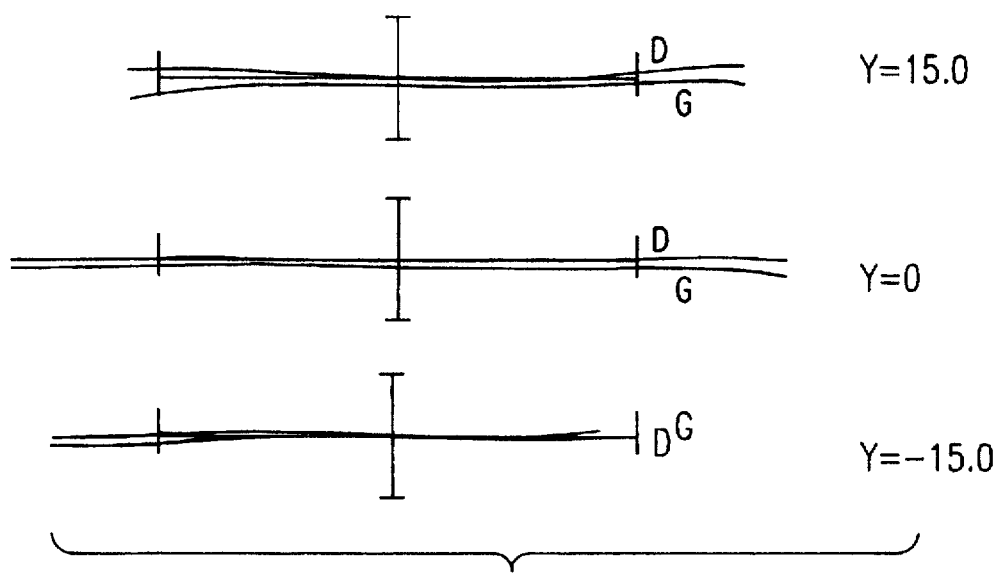
FIG. 30 is a drawing that shows the coma aberrations at a photographic magnification of $-1/30$ at the maximum telephoto state of the second embodiment when the image is shifted.

FIGS. 25–30 are coma aberration diagrams that show the coma aberrations when the image is shifted 0.01 rad (radians) with respect to the optical axis in the second embodiment. FIG. 25 shows the coma aberrations at the infinite focus condition at the maximum wide angle state; FIG. 26 shows the coma aberrations at the infinite focus condition at the intermediate focal length condition; and FIG. 27 shows the coma aberrations at the infinite focus condition at the maximum telephoto state. FIG. 28 shows the coma aberrations at a photographic magnification of –1/30 at the maximum wide angle state; FIG. 29 shows the coma aberrations at a photographic magnification of –1/30 at the intermediate focal length condition; and FIG. 30 shows the coma aberrations at a photographic magnification of –1/30 at the maximum telephoto state.

In each aberration diagram, FN0 indicates the F-number, NA indicates the aperture number, Y indicates the height of the image, D indicates the d-line (λ=587.6 nm), and G indicates the g-line (λ=453.8 nm).

On the aberration diagrams that show the astigmatism aberrations, the solid lines show the sagittal image surfaces, and the dashed lines show the meridional image surfaces. On the aberration diagrams that show the spherical aberrations, the dashed lines show the sine condition.

Each aberration diagram in FIGS. 25–30 shows coma aberrations at Y=15.0, 0, and –15.0 when the lens component L42 is moved in the positive direction for the image height Y.

As is evident on each aberration diagram, with the present embodiment, the various aberrations are properly corrected even when the image is shifted at each focus focal length condition and at each photographic focal length condition.

Figure 31:
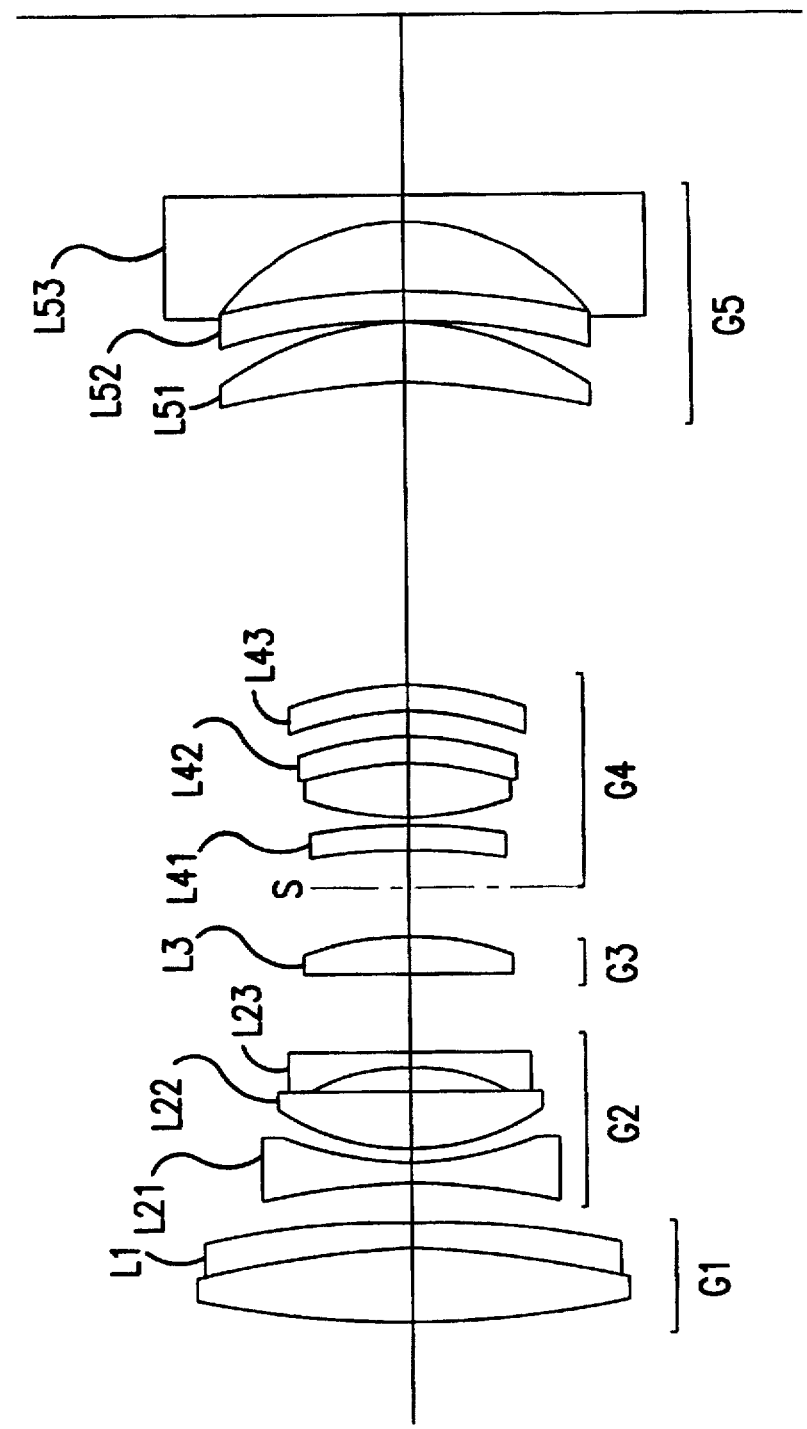
FIG. 31 is a drawing that shows the structure of a zoom lens system that pertains to the third embodiment of this invention.

FIG. 31 is a drawing that shows the lens structure of the zoom lens system that pertains to the third embodiment of this invention.

The zoom lens system of FIG. 31 comprises, in order from the object side, a first lens unit G1 having a compound lens L1 with a biconvex lens and a negative meniscus lens with a concave surface facing the object side; a second lens unit G2 having a biconcave lens L21, a biconvex lens L22, and a negative meniscus lens L23 with a concave surface facing the object side; a third lens unit G3 having a biconvex lens L3; a fourth lens unit G4 having a negative meniscus lens L41 with a concave surface facing the object side, a compound positive lens L42 with a biconvex lens and a negative meniscus lens with a concave surface on the object side, and a positive meniscus lens L43 with a concave surface on the object side; and a fifth lens unit G5 having a positive meniscus lens L51 with a concave surface facing the object side, a negative meniscus lens L52 with a concave surface facing the object side, and a negative meniscus lens L53 with a concave surface facing the object side.

An aperture stop S is positioned between the third lens unit G3 and the fourth lens unit G4 and moves as one unit with the fourth lens unit G4 when the magnification changes from the maximum wide angle state to the maximum telephoto state.

FIG. 31 shows the relative positions of each lens unit at the maximum wide angle state. When the magnification is changed to at or near the maximum telephoto state, the lenses move along the zooming focus shown by the arrows in FIG. 2 on the optical axis.

In addition, the compound positive lens L42 within the fourth lens unit G4 is moved in a direction substantially perpendicular to the optical axis, shifting the image and compensating the change in the image position resulting from camera shaking and the like. As shown in the above-mentioned FIG. 51, the compound positive lens L42 moves from a position on the optical axis to a position outside the optical axis along an arc-shaped path through the rotation of the supporting arms about the support points.

Furthermore, in addition to the third lens unit G3 being moved along the optical axis toward the image side to focus a close-range object, the third lens unit G3 is moved along the optical axis and compensates the back focus variations that occur when the image is shifted.

The values of the items of the third embodiment of this invention are displayed in the following Table (3). In Table (3), f indicates the focal length, FN0 indicates the F-number, 2ω indicates the field angle, and Bf indicates the back focus. The surface numbers indicate the order of the lens surfaces from the object side, which is the direction from which the light rays proceed, and the index of refraction and the Abbe number each indicate values for the d-line (λ=587.6 nm).

The aperture ratios at the infinite focus condition and the close-range focus condition are defined by the F-number (FN0) and the image side aperture number (NA), respectively.

TABLE 3

$f = 38.80–75.35–153.20$ mm
$FNO = 3.96–6.31–10.00$
$2\omega = 59.04–30.96–15.64°$

| surface number | radius of curvature | space between surfaces | Abbe number | index of refraction |
|---|---|---|---|---|
| 1 | 70.8082 | 4.019 | 70.41 | 1.48749 |
| 2 | −40.6619 | 1.381 | 23.01 | 1.86074 |
| 3 | −62.5747 | (d3 = variable) | | |
| 4 | −41.7240 | 1.130 | 45.37 | 1.79668 |
| 5 | 22.0148 | 0.880 | | |
| 6 | 18.8056 | 3.140 | 25.80 | 1.78472 |
| 7 | −111.1766 | 1.005 | | |
| 8 | −21.3899 | 1.130 | 45.37 | 1.79668 |
| 9 | −751.2537 | (d9 = variable) | | |
| 10 | 810.9254 | 2.135 | 64.10 | 1.51860 |
| 11 | −19.9313 | (d11 = variable) | | |
| 12 | ∞ | 2.260 | (aperture stop) | |
| 13* | −35.4504 | 1.256 | 30.24 | 1.58518 |
| 14 | −62.7907 | 0.377 | | |
| 15 | 28.0427 | 3.391 | 70.41 | 1.48749 |
| 16 | −14.9046 | 1.256 | 23.01 | 1.86074 |
| 17 | −24.8009 | 2.009 | | |
| 18 | −24.4290 | 1.633 | 57.57 | 1.49108 |
| 19 | −20.8392 | (d19 = variable) | | |
| 20 | −59.3577 | 3.140 | 25.50 | 1.80458 |
| 21 | −21.9553 | 0.251 | | |
| 22 | −47.2068 | 1.256 | 45.37 | 1.79668 |
| 23 | −141.3684 | 4.270 | | |
| 24 | −15.1073 | 1.507 | 49.45 | 1.77279 |
| 25 | −860.3217 | (Bf) | | |

(aspherical surface data)

| | k | $C_2$ | $C_4$ |
|---|---|---|---|
| surface 13 | 1.0000 | 0.0000 | $-0.3701 \times 10^{-4}$ |

| $C_6$ | $C_8$ | $C_{10}$ |
|---|---|---|
| $-0.6034 \times 10^{-6}$ | $0.2248 \times 10^{-7}$ | $0.5094 \times 10^{-9}$ |

(variable intervals at changing of magnification)

| f | 38.8042 | 75.3472 | 153.2035 |
|---|---|---|---|
| d3 | 2.1349 | 12.5510 | 24.9955 |
| d9 | 5.0341 | 3.0604 | 1.8837 |
| d11 | 2.5008 | 4.4745 | 5.6512 |
| d19 | 16.8164 | 8.9427 | 1.8837 |
| Bf | 9.3193 | 31.2225 | 70.0665 |

(movement amount of lens component L42 when image is shifted 0.01 (rad))

| f | 38.8042 | 75.3472 | 153.2035 |
|---|---|---|---|
| lens movement amount | 0.3148 | 0.3831 | 0.4903 |
| image shift amount | 0.3880 | 0.7535 | 1.5319 |

(focusing movement amount of third lens unit G3 when the photographic magnification is −1/30)

| f | 38.8042 | 75.3472 | 153.2035 |
|---|---|---|---|
| movement amount | 1.0427 | 0.7921 | 0.7200 |

The movement direction facing from the object side to the image surface is positive.

(variation amounts of Bf and spherical aberration when the lens component L42 has moved in the optical axis direction)

| f | 38.8042 | 75.3472 | 153.2035 |
|---|---|---|---|
| Bf variation amount | −0.0412 | −0.1040 | −0.1862 |
| spherical aberration variation amount | 0.0056 | 0.0141 | 0.0390 |

TABLE 3-continued

The back focus variation amount ΔBf and the spherical aberration variation amount ΔSA indicate the variation amounts that occur when the lens component L42 has moved 0.03 mm. Movement is positive in the direction of the object side.

(values corresponding to conditions)

fb = 48.742
fa = 37.285
(1) ΔSA/ΔBf = −0.136 (maximum wide angle state)
    ΔSA/ΔBf = −0.136 (intermediate focal length condition)
    ΔSA/ΔBf = −0.209 (maximum telephoto state)
(2) |fb|/ft = 0.318
(3) |fa|/ft = 0.243

Figure 32:
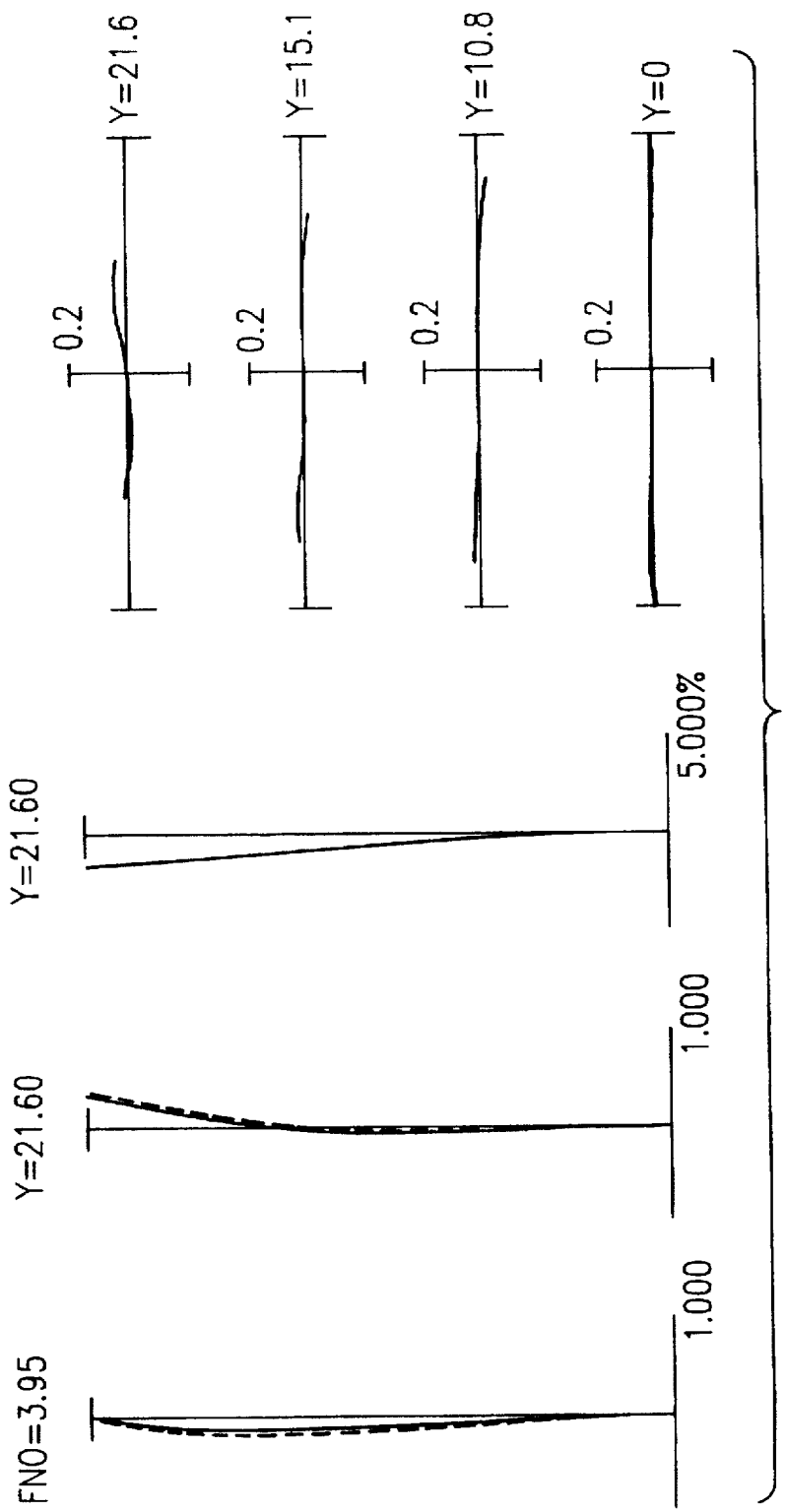
FIG. 32 is a drawing that shows various aberrations at the infinite focus condition at the maximum wide angle state of the third embodiment.
Figure 33:
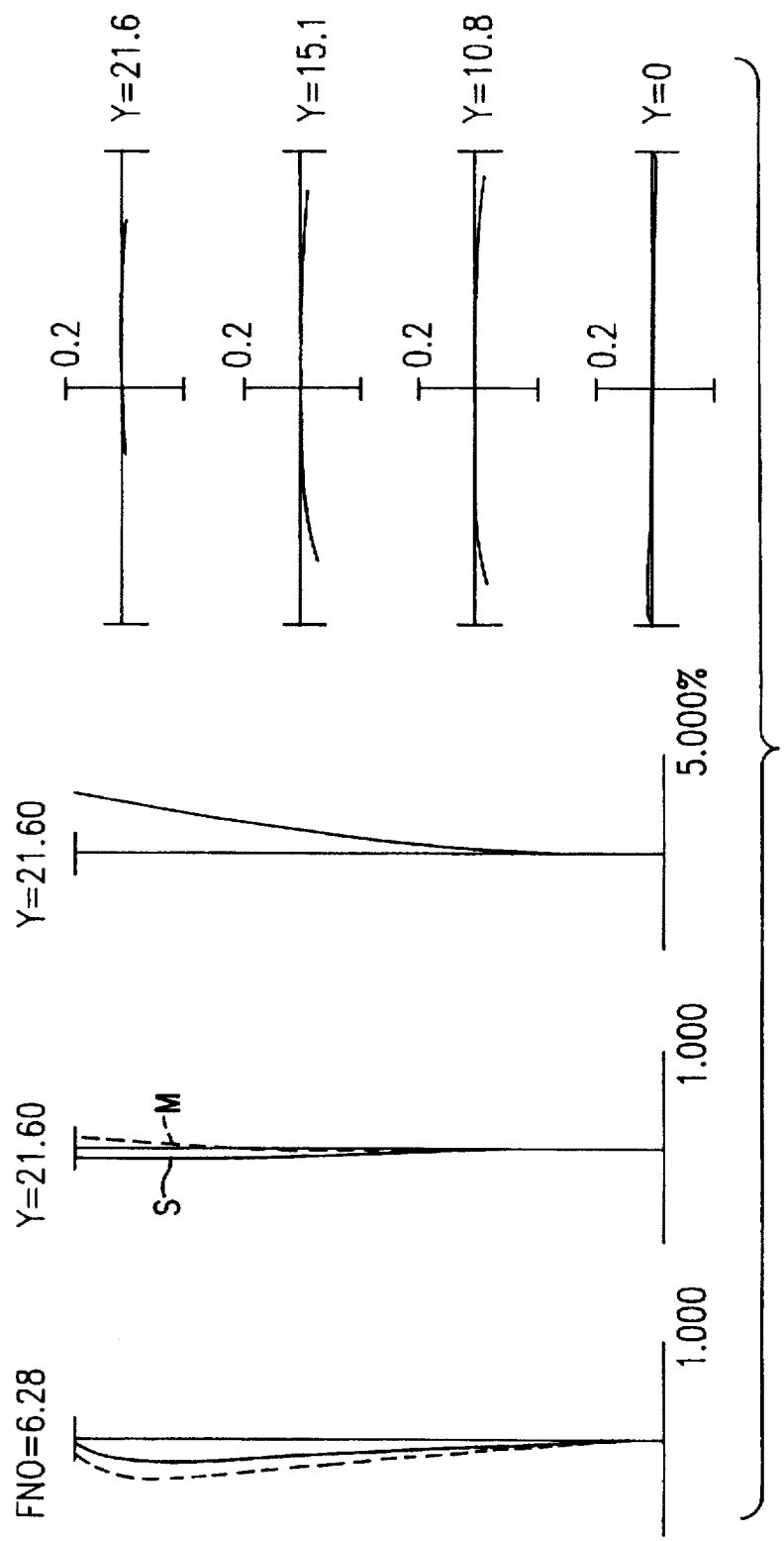
FIG. 33 is a drawing that shows various aberrations at the infinite focus condition at the intermediate focal length of the third embodiment.
Figure 34:
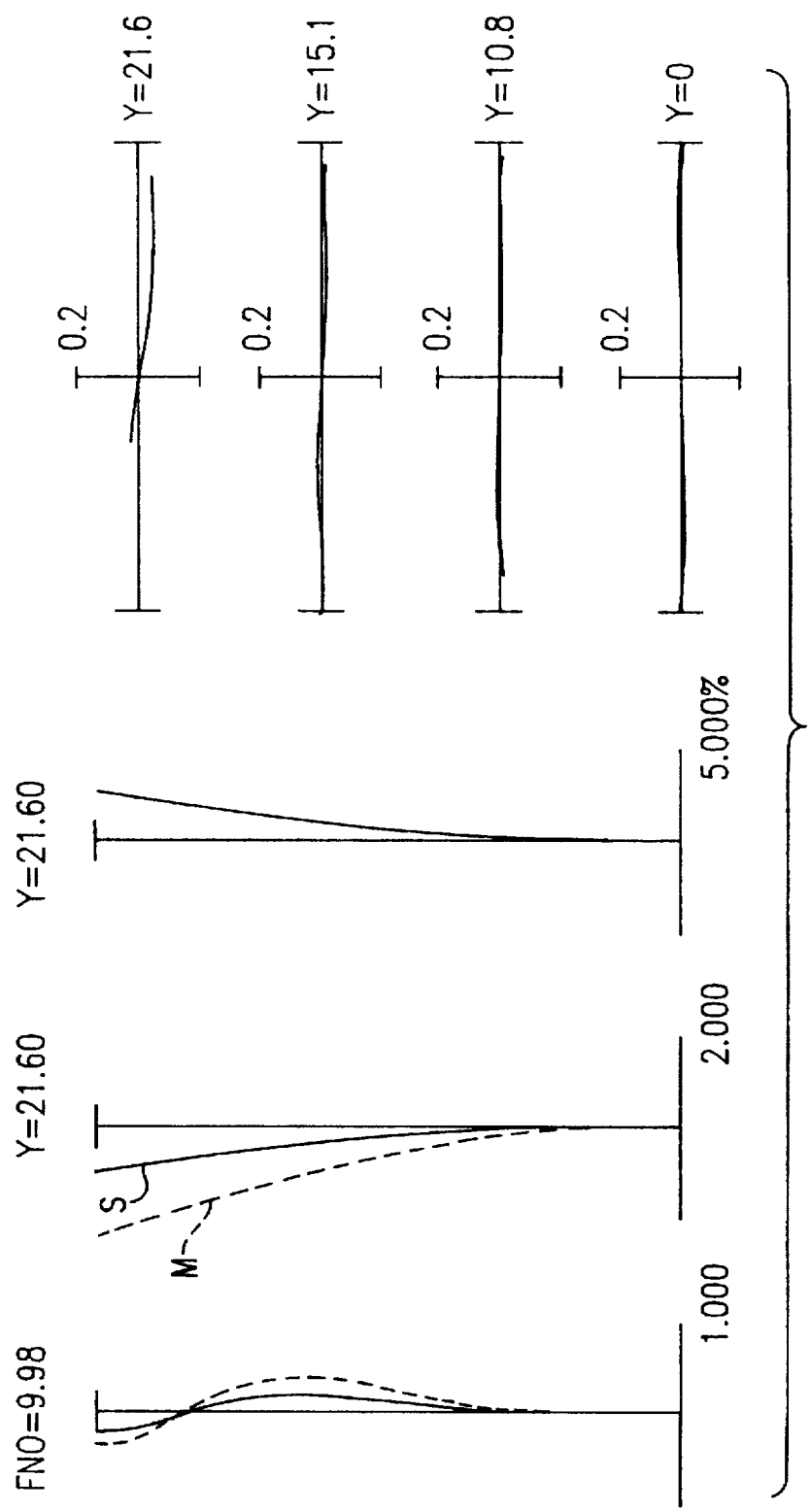
FIG. 34 is a drawing that shows various aberrations at the infinite focus condition at the maximum telephoto state of the third embodiment.

FIGS. 32–37 are drawings that show the various aberration diagrams for the third embodiment. FIG. 32 is a drawing that shows the various aberrations at the infinite focus condition at the maximum wide angle state; FIG. 33 shows the various aberrations at the infinite focus condition at the intermediate focal length condition; and FIG. 34 shows the aberrations at the infinite focus condition at the maximum telephoto state.

Figure 35:
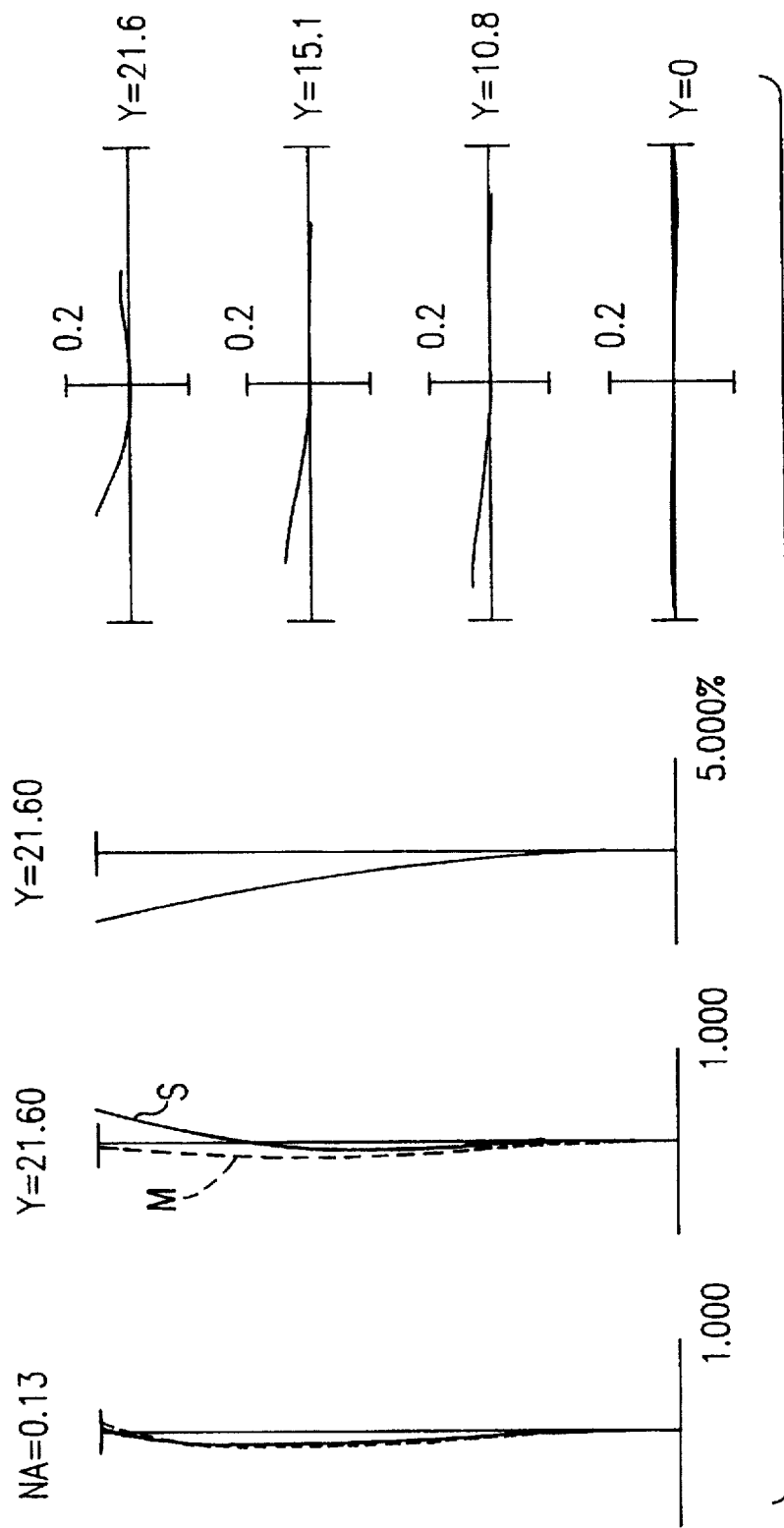
FIG. 35 is a drawing that shows the aberration diagrams at a photographic magnification of $-1/30$ at the maximum wide angle state of the third embodiment.
Figure 36:
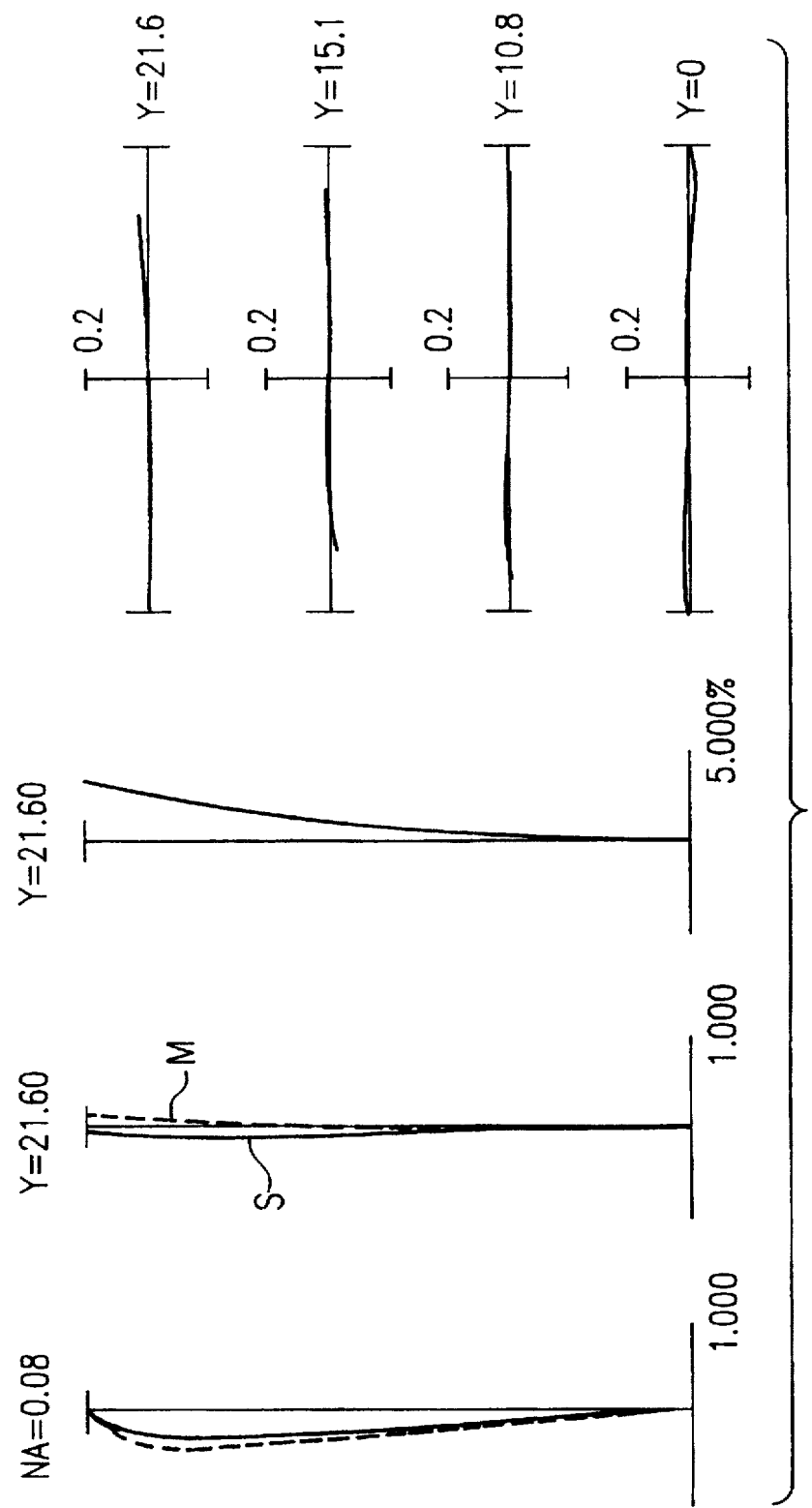
FIG. 36 is a drawing that shows various aberrations at a photographic magnification of $-1/30$ at the intermediate focal length of the embodiment.
Figure 37:
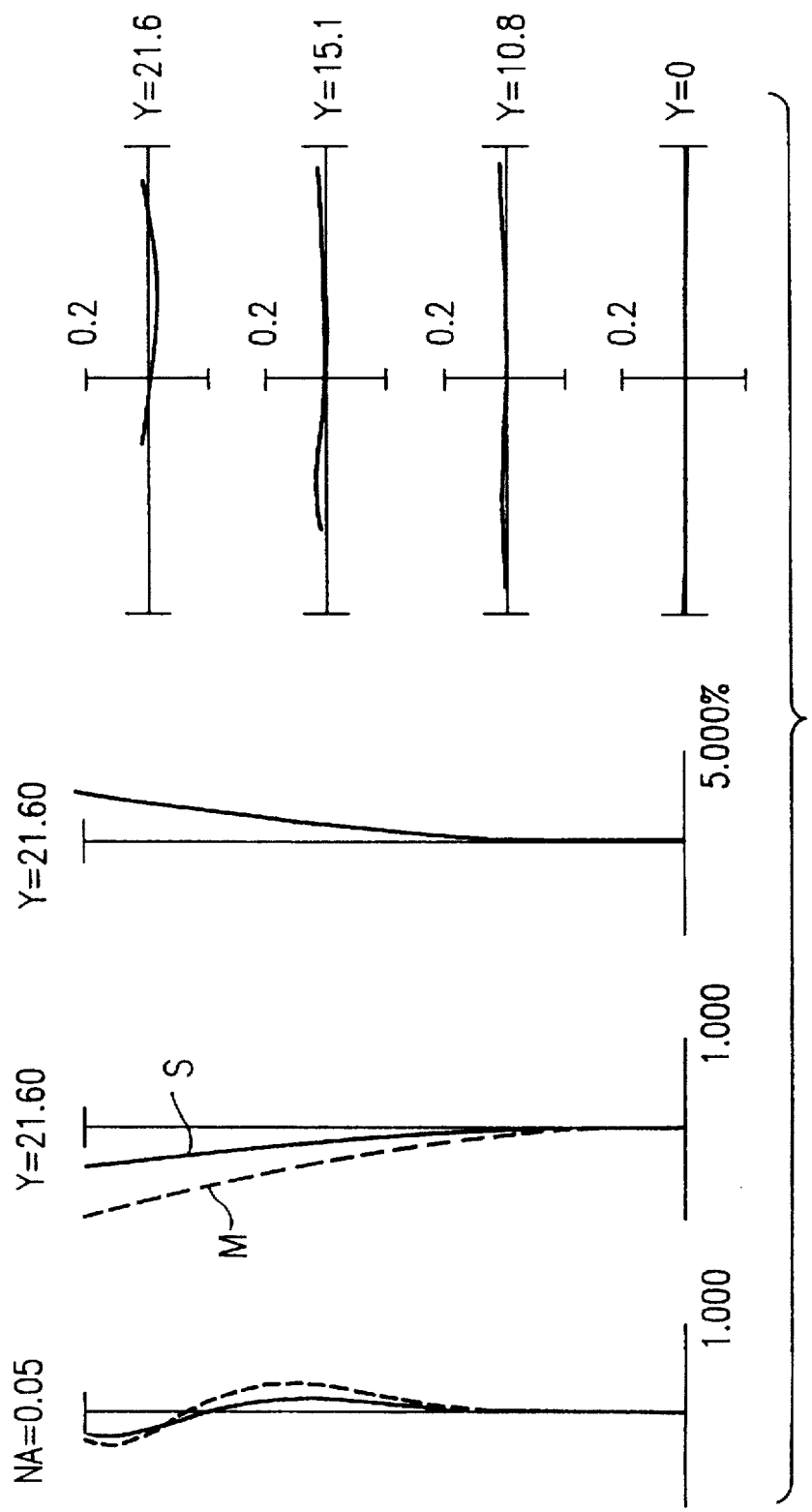
FIG. 37 is a drawing that shows various aberrations at a photographic magnification of $-1/30$ at the maximum telephoto state of the third embodiment.

FIG. 35 is a drawing that shows the aberration diagrams at a photographic magnification of −1/30 at the maximum wide angle state; FIG. 36 shows the aberrations at a photographic magnification of −1/30 at the intermediate focal length condition; and FIG. 37 shows the aberrations at a photographic magnification of −1/30 at the maximum telephoto state.

Figure 38:
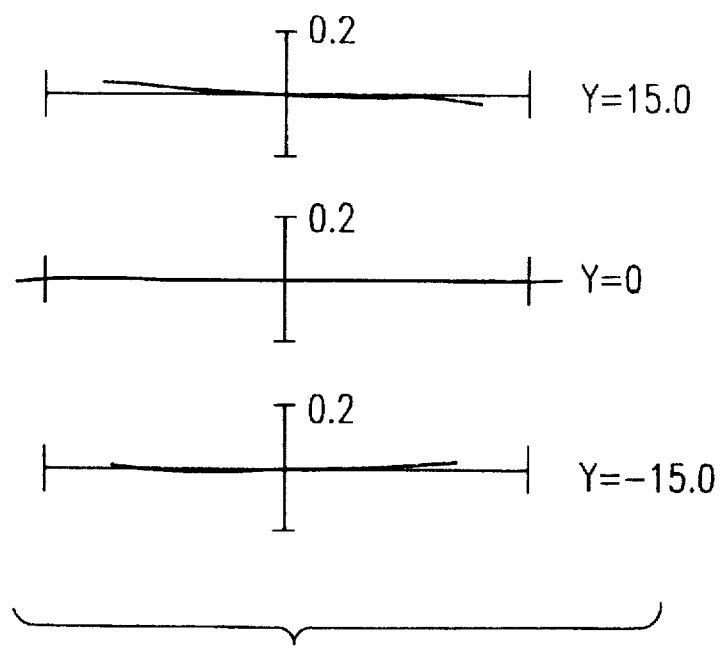
FIG. 38 is a drawing that shows the coma aberrations at the infinite focus condition at the maximum wide angle state of the third embodiment when the image is shifted.
Figure 39:
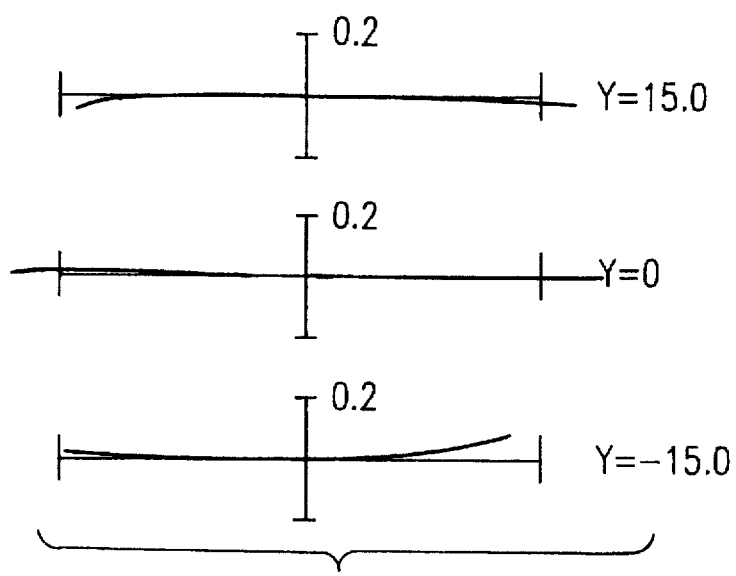
FIG. 39 is a drawing that shows the coma aberrations at the infinite focus condition at the intermediate focal length of the third embodiment when the image is shifted.
Figure 40:
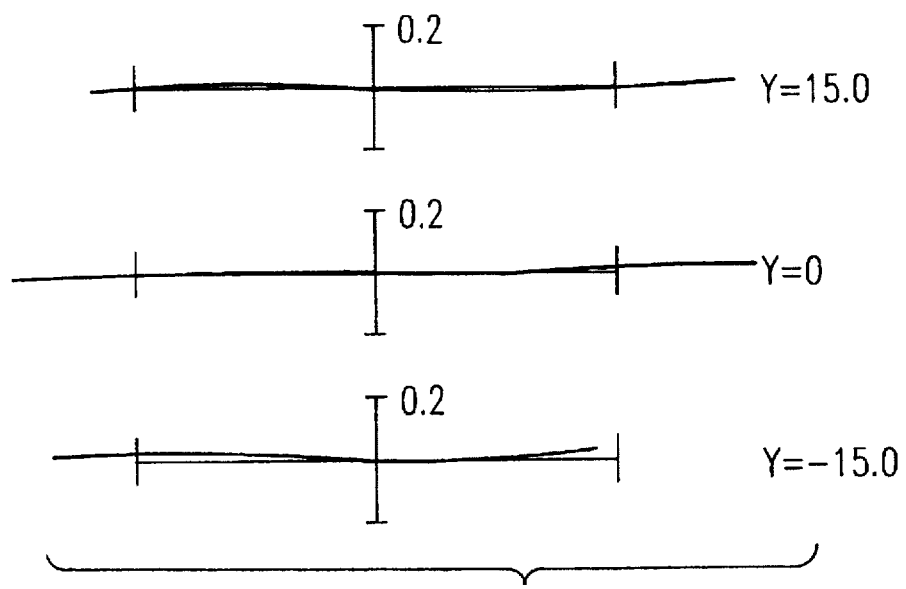
FIG. 40 is a drawing that shows the coma aberrations at the infinite focus condition at the maximum telephoto state of the third embodiment when the image is shifted.
Figure 41:
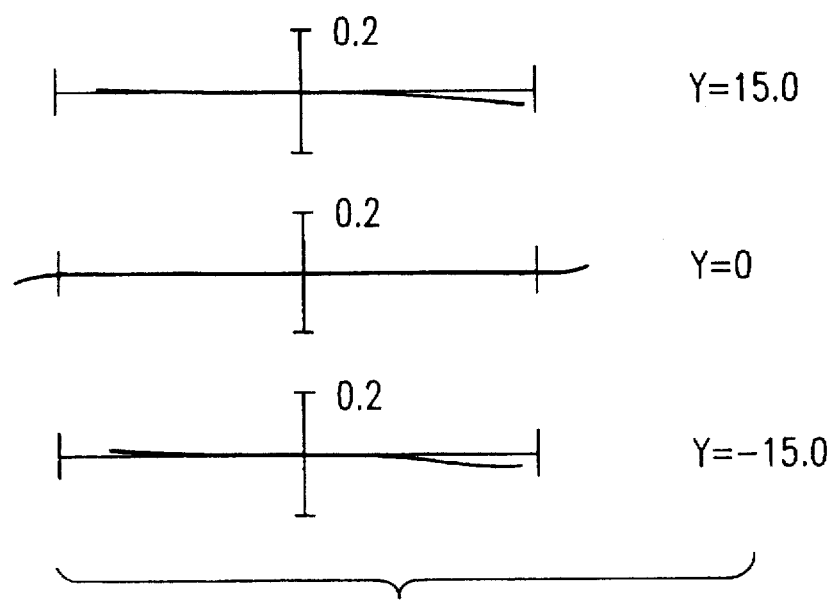
FIG. 41 is a drawing that shows the coma aberrations at a photographic magnification of $-1/30$ at the maximum wide angle state of the third embodiment when the image is shifted.
Figure 42:
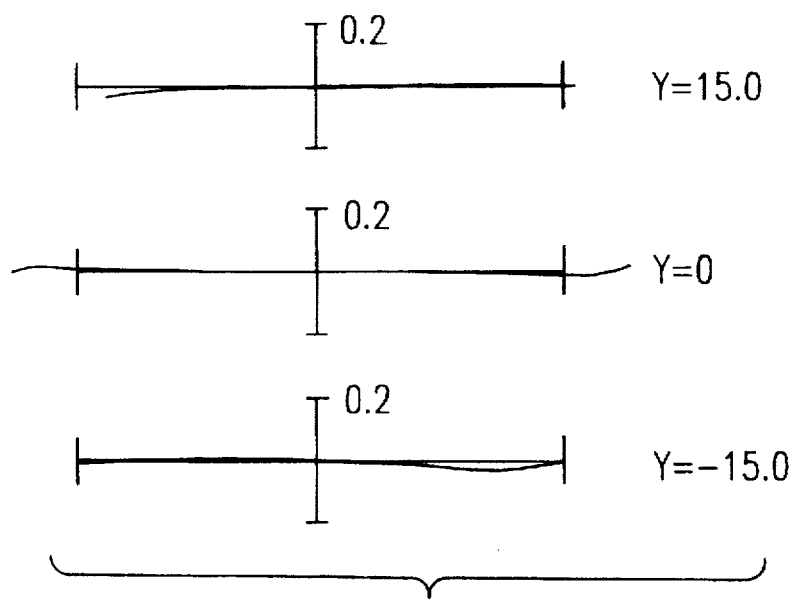
FIG. 42 is a drawing that shows the coma aberrations at a photographic magnification of −1/30 at the intermediate focal length of the third embodiment when the image is shifted.
Figure 43:
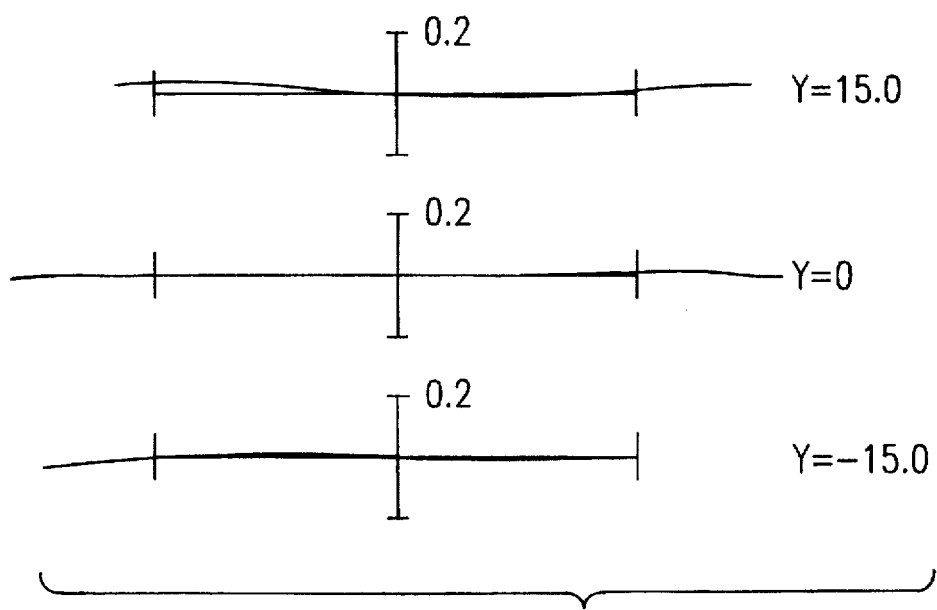
FIG. 43 is a drawing that shows the coma aberrations at a photographic magnification of −1/30 at the maximum telephoto state of the third embodiment when the image is shifted.

FIGS. 38–43 are coma aberration diagrams that show the coma aberrations when the image is shifted 0.01 rad (radians) with respect to the optical axis in the third embodiment. FIG. 38 shows the coma aberrations at the infinite focus condition at the maximum wide angle state; FIG. 39 shows the coma aberrations at the infinite focus condition at the intermediate focal length condition; and FIG. 40 shows the coma aberrations at the infinite focus condition at the maximum telephoto state. FIG. 41 shows the coma aberrations at a photographic magnification of −1/30 at the maximum wide angle state; FIG. 42 shows the coma aberrations at a photographic magnification of −1/30 at the intermediate focal length condition; and FIG. 43 shows the coma aberrations at a photographic magnification of −1/30 at the maximum telephoto state.

In each aberration diagram, FNO indicates the F-number, NA indicates the aperture number, and Y indicates the height of the image.

On the aberration diagrams that show the astigmatism aberrations, the solid lines show the sagittal image surface S, and the dashed lines show the meridional image surface M. On the aberration diagrams that show the spherical aberrations, the dashed lines show the sine condition.

Each aberration diagram in FIGS. 38–43 shows coma aberrations at Y=15.0, 0, and −15.0 when the lens component L42 is moved in the positive direction for the image height Y.

As is evident on each aberration diagram, with the present embodiment, the various aberrations are properly corrected even when the image is shifted at each focus focal length condition and at each photographic focal length condition.

In addition, with each embodiment described above, since an important object is to shift the image and compensate image position variations, the structure is made to be such that no curvature of the image surface occurs when the shift lens unit is moved. However, it is possible to make the structure such that the image surface inclines a fixed amount when the shift lens unit is moved and to use the zoom lens system of this invention as a tilt lens.

Figure 44:
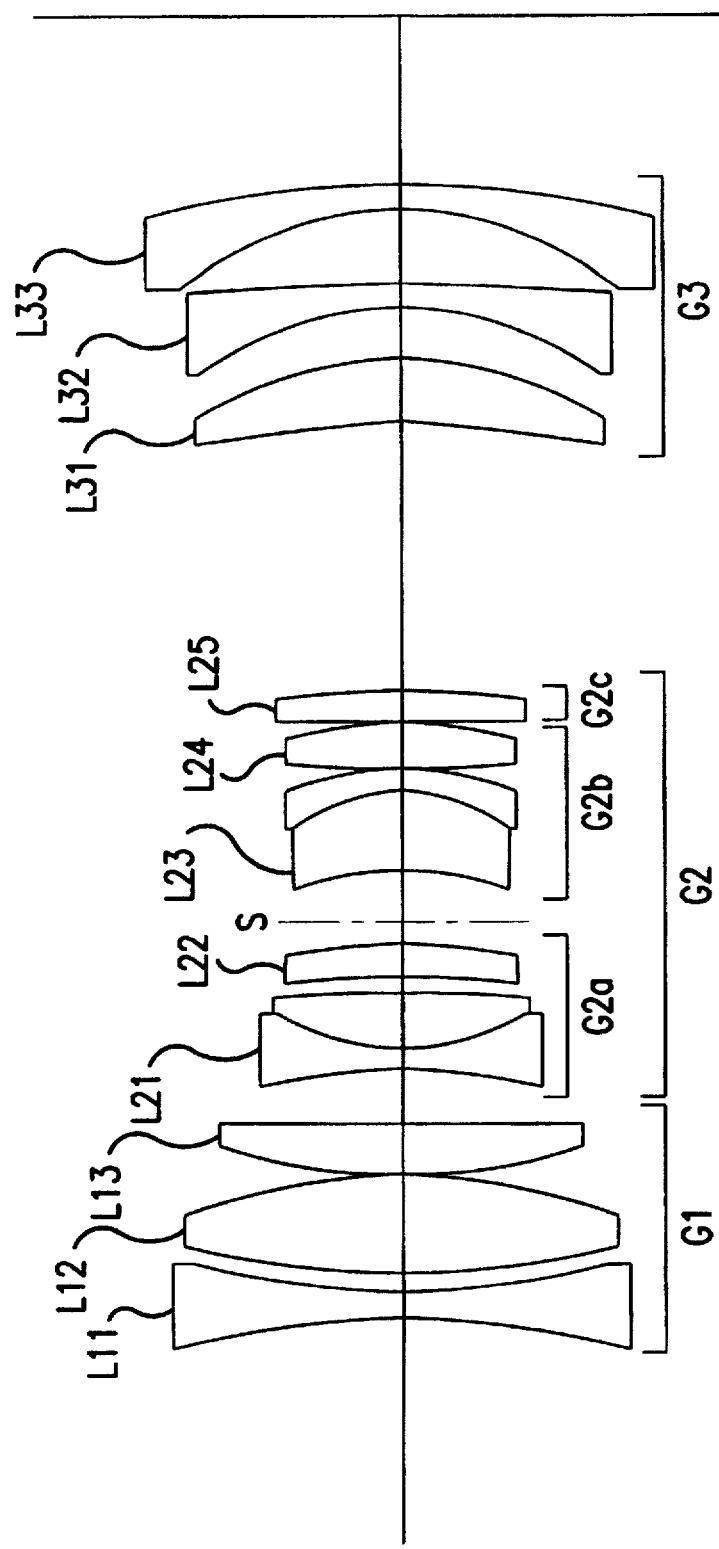
FIG. 44 is a drawing that shows the structure of a zoom lens system that pertains to the fourth embodiment of this invention.

FIG. 44 is a drawing that shows the lens structure of the zoom lens system that pertains to the fourth embodiment of this invention.

The zoom lens system of FIG. 44 comprises, in order from the object side, a first lens unit G1 having a biconcave lens L11, a biconvex lens L12, and a positive meniscus lens L13 with a convex surface facing the object side; a second lens unit G2 including a first lens sub-unit G2a that has an overall negative refractive power and that consists of a compound lens L21, with a biconcave lens and a biconvex lens, and a positive meniscus lens L22 with a concave surface facing the object side; a second lens sub-unit G2b having a compound lens L23 with a positive meniscus lens with a concave surface facing the object side and a negative meniscus lens with a concave surface facing the object side and a biconvex lens L24; a third lens sub-unit G2c having a positive meniscus lens L25 with a concave surface facing the object side; and a third lens unit G3 having a positive meniscus lens L31 with a concave surface facing the object side, a negative meniscus lens L32 with a concave surface facing the object side, and a negative meniscus lens L33 with a concave surface facing the object side.

The first lens sub-unit G2a, the second lens subunit G2b, and the third lens sub-unit G2c form the second lens unit G2 that has an overall positive refractive power.

An aperture stop S is positioned between the first lens sub-unit G2a and the second lens sub-unit G2b.

FIG. 44 shows the relative positions of each lens unit at the maximum wide angle state. When the magnification is changed to at or near the maximum telephoto state, the lenses move along the zooming focus shown by the arrows in FIG. 4 on the optical axis.

In addition, the second lens sub-unit G2b is moved in a direction substantially perpendicular to the optical axis, shifting the image and compensating the change in the image position resulting from camera shaking and the like. As shown in the above-mentioned FIG. 51, the second lens sub-unit G2b moves from a position on the optical axis to a position outside the optical axis along an arc-shaped path through the rotation of the supporting arms about the support points.

Furthermore, in addition to the third lens unit G3 being moved along the optical axis toward the image side to focus a close-range object, the lens unit G3 is moved along the optical axis and compensates the back focus variations that occur when the image is shifted.

The values of the items of the fourth embodiment of this invention are displayed in the following Table (4). In Table (4), f indicates the focal length, FN0 indicates the F-number, 2ω indicates the field angle, and Bf indicates the back focus. The surface numbers indicate the order of the lens surfaces from the object side, which is the direction from which the light rays proceed, and the index of refraction and the Abbe number each indicate values for the d-line (λ=587.6 nm).

TABLE 4 f = 39.03–70.09–102.19 mm
FN0 = 4.27–6.56–8.14
2ω = 59.66–33.46–23.28°

| surface number | radius of curvature | space between surfaces | Abbe number | index of refraction |
|---|---|---|---|---|
| 1 | −46.7896 | 1.500 | 33.89 | 1.80384 |
| 2 | 44.8259 | 1.000 | | |
| 3 | 47.1109 | 5.300 | 54.01 | 1.61720 |
| 4 | −33.5408 | 0.100 | | |
| 5 | 31.4080 | 2.600 | 60.14 | 1.62041 |
| 6 | 210.2769 | (d6 = variable) | | |
| 7 | −29.1500 | 1.100 | 46.55 | 1.80411 |
| 8 | 12.5692 | 3.100 | 28.19 | 1.74000 |

TABLE 4-continued

| 9 | −73.1872 | 0.800 | | |
|---|---|---|---|---|
| 10 | −59.8371 | 2.000 | 64.10 | 1.51860 |
| 11 | −26.9149 | 1.200 | | |
| 12 | ∞ | 2.800 | (aperture stop) | |
| 13 | −15.9354 | 4.500 | 69.98 | 1.51860 |
| 14 | −9.2548 | 1.400 | 23.01 | 1.86074 |
| 15 | −14.6436 | 0.100 | | |
| 16 | 127.5589 | 2.300 | 69.98 | 1.51860 |
| 17 | −23.2337 | 0.300 | | |
| 18 | −381.5452 | 1.500 | 64.10 | 1.51680 |
| 19 | −71.4370 | (d19 = variable) | | |
| 20 | −47.2541 | 3.400 | 27.61 | 1.75520 |
| 21 | −20.3064 | 2.700 | | |
| 22 | −18.3442 | 1.300 | 43.35 | 1.84042 |
| 23 | −168.4858 | 4.000 | | |
| 24 | −18.4014 | 1.400 | 55.60 | 1.69680 |
| 25 | −57.0500 | (Bf) | | |

(variable intervals at changing of magnification)

| f | 39.0333 | 70.0879 | 102.1896 |
|---|---|---|---|
| d6 | 3.2341 | 10.5797 | 17.0681 |
| d19 | 14.7319 | 7.1231 | 2.8939 |
| Bf | 8.9254 | 29.7244 | 46.6832 |

(movement amount of second lens sub-unit G2b when image is shifted 0.005 (rad))

| f | 39.0333 | 70.0879 | 102.1896 |
|---|---|---|---|
| lens movement amount | 0.1948 | 0.3496 | 0.5102 |
| image shift amount | 0.2007 | 0.2410 | 0.2935 |

(variation amounts of Bf and spherical aberration when the second lens sub-unit G2b has moved in the optical axis direction)

| f | 39.0333 | 70.0879 | 102.1896 |
|---|---|---|---|
| Bf variation amount | −0.0433 | −0.1114 | −0.1862 |
| spherical aberration variation amount | 0.0012 | 0.0010 | 0.0034 |

The back focus variation amount ΔBf and the spherical aberration variation amount ΔSA indicate the variation amounts that occur when the second lens sub-unit G2b has moved 0.03 mm. Movement is positive in the direction of the object side.

(values corresponding to conditions)

fb = 38.409
fa = 39.965
(1) ΔSA/ΔBf = −0.028 (maximum wide angle state)
    ΔSA/ΔBf = −0.009 (intermediate focal length condition)
    ΔSA/ΔBf = −0.018 (maximum telephoto state)
(2) |fb|/ft = 0.376
(3) |fa|/ft = 0.391

Figure 45:
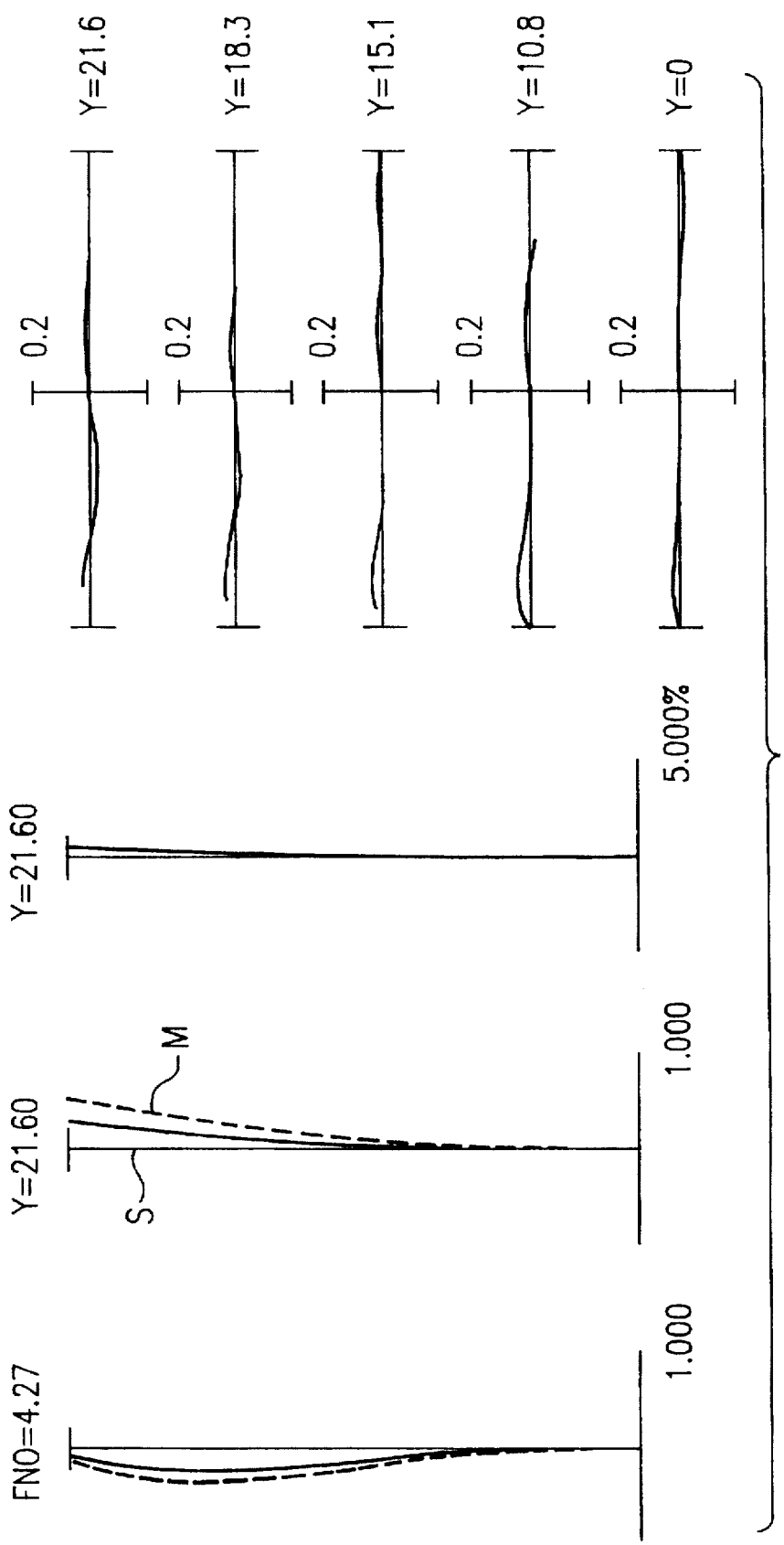
FIG. 45 is a drawing that shows various aberrations at the infinite focus condition at the maximum wide angle state of the fourth embodiment.
Figure 46:
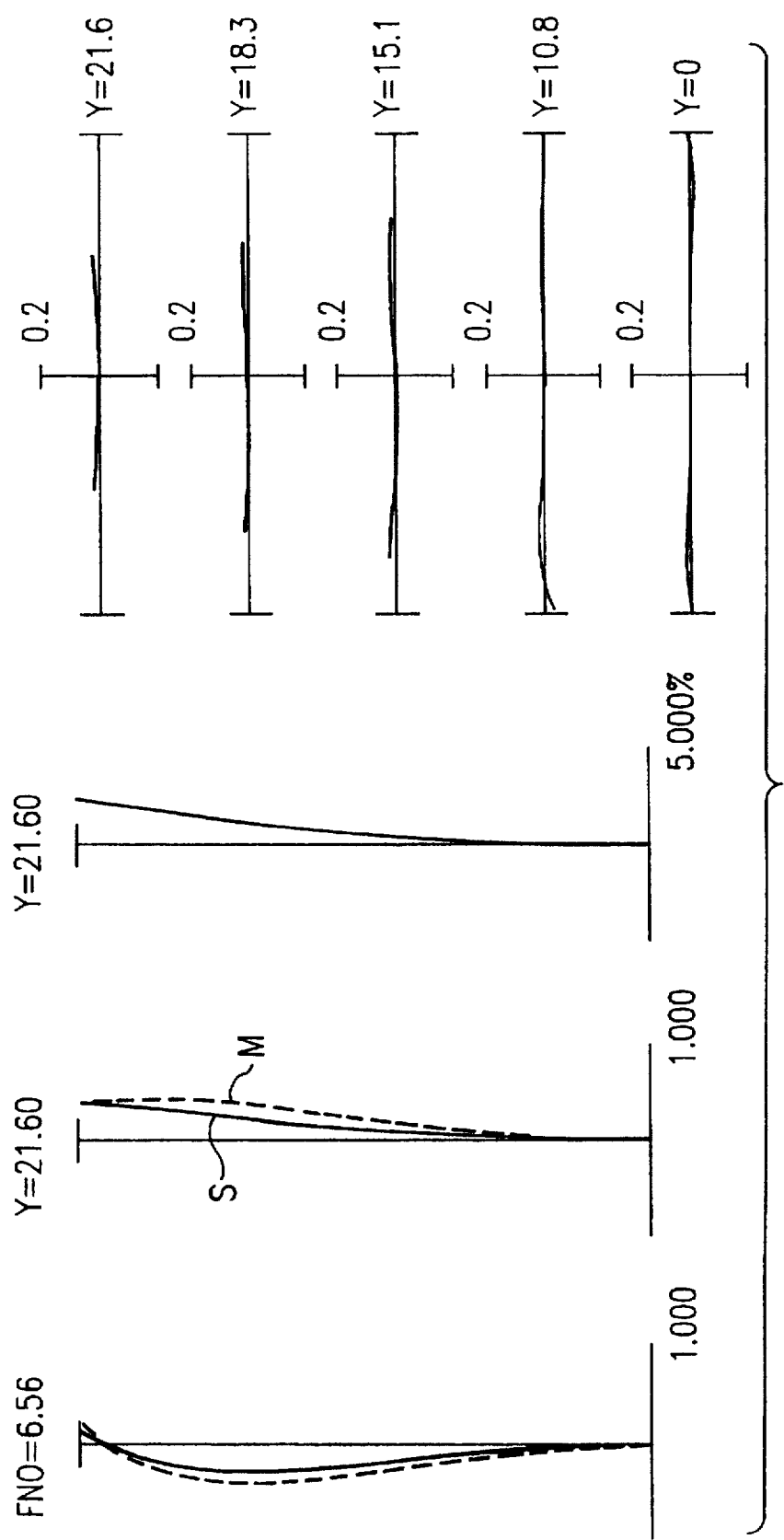
FIG. 46 is a drawing that shows various aberrations at the infinite focus condition at the intermediate focal length of the fourth embodiment.
Figure 47:
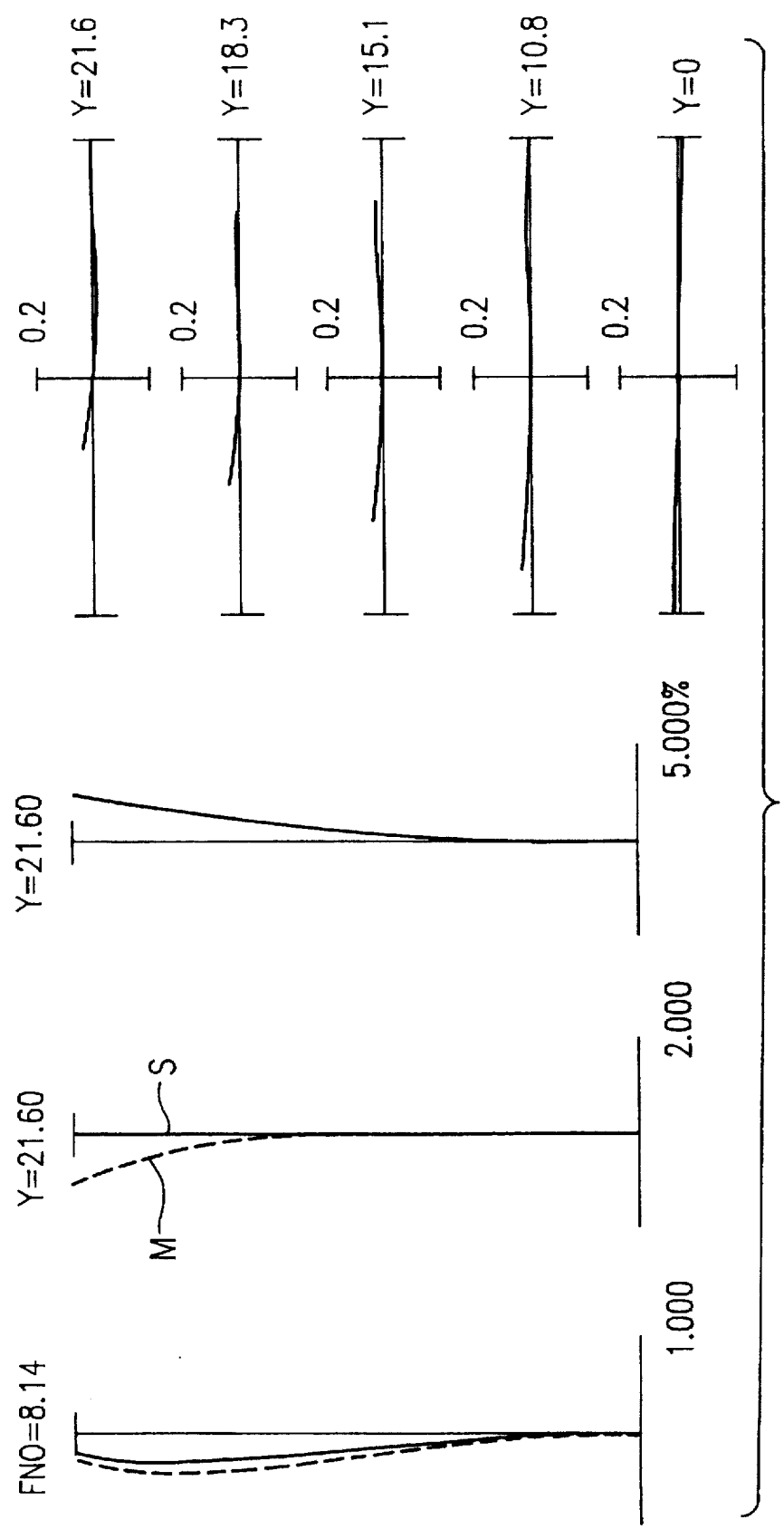
FIG. 47 is a drawing that shows various aberrations at the infinite focus condition at the maximum telephoto state of the fourth embodiment.

FIGS. 45–47 are drawings that show the various aberration diagrams for the fourth embodiment. FIG. 45 is a drawing that shows the various aberrations at the infinite focus condition at the maximum wide angle state; FIG. 46 shows the various aberrations at the infinite focus condition at the intermediate focal length condition; and FIG. 47 shows the aberrations at the infinite focus condition at the maximum telephoto state.

Figure 48:
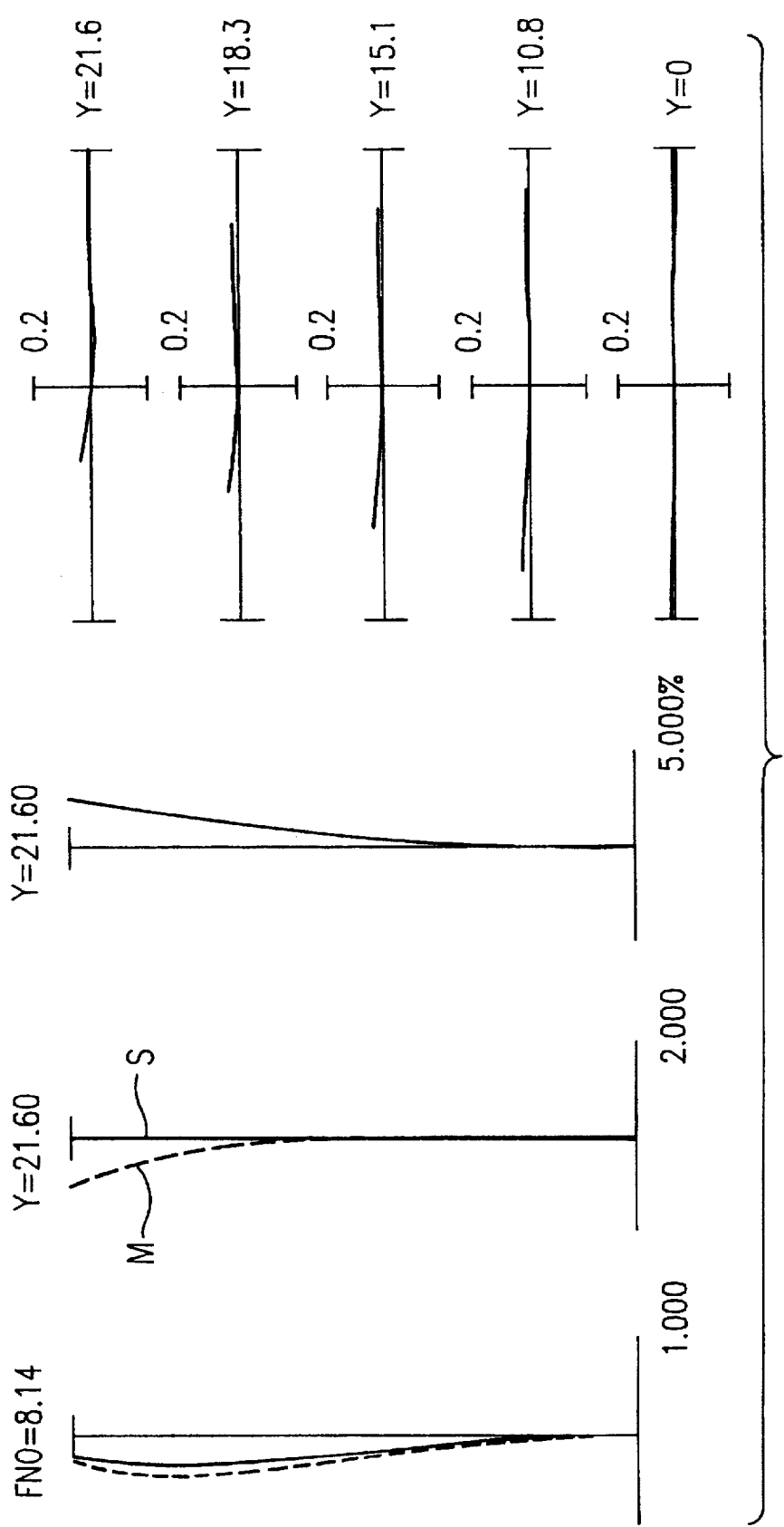
FIG. 48 is a drawing that shows the coma aberrations at the infinite focus condition at the maximum wide angle state of the fourth embodiment when the image is shifted.
Figure 49:
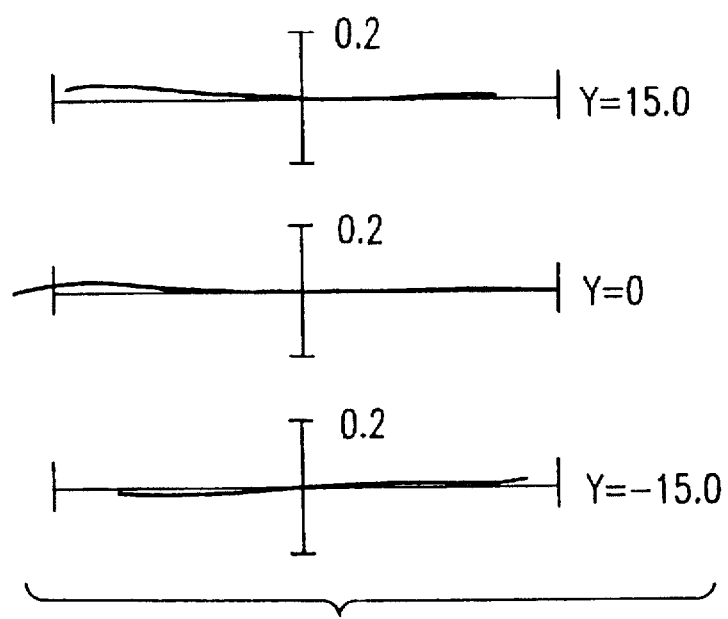
FIG. 49 is a drawing that shows the coma aberrations at the infinite focus condition at the intermediate focal length of the fourth embodiment when the image is shifted.
Figure 50:
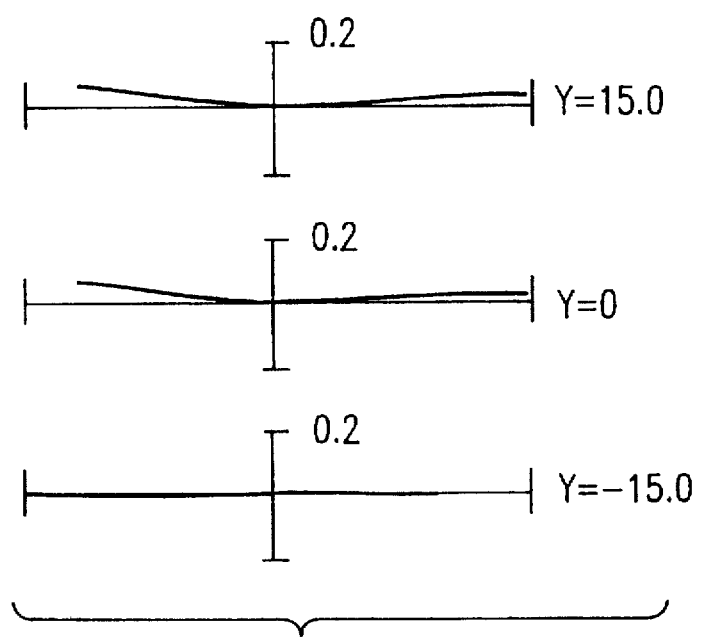
FIG. 50 is a drawing that shows the coma aberrations at the infinite focus condition at the maximum telephoto state of the fourth embodiment when the image is shifted.

FIGS. 48–50 are coma aberration diagrams that show the coma aberrations when the image is shifted 0.005 rad (radians) with respect to the optical axis in the fourth embodiment. FIG. 48 shows the coma aberrations at the infinite focus condition at the maximum wide angle state; FIG. 49 shows the coma aberrations at the infinite focus condition at the intermediate focal length condition; and FIG. 50 shows the coma aberrations at the infinite focus condition at the maximum telephoto state.

In each aberration diagram, FN0 indicates the F-number, and Y indicates the height of the image.

On the aberration diagrams that show the astigmatism aberrations, the solid lines show the sagittal image surface and the dashed lines show the meridional image surface. On the aberration diagrams that show the spherical aberrations, the dashed lines show the sine condition.

Each aberration diagram in FIGS. 48–50 shows coma aberrations at Y=15.0, 0, and −15.0 when the second lens sub-unit G2b is moved in the positive direction for the image height Y.

As is evident on each aberration diagram of the present embodiment, the various aberrations are properly corrected even when the image is shifted at each focus focal length condition.

The image composing capacity for the case in which the image is shifted a maximum of 0.01 (rad) with respect to the optical axis was described for each embodiment as an example, but a proper image composing capacity can also be obtained for larger shifting amounts using this invention.

In addition, with each embodiment described above, since an important object is to shift the image and compensate image position variations, the structure is made to be such that no curvature of the image surface occurs when the shift lens unit is moved. However, it is possible to make the structure such that the image surface inclines a fixed amount when the shift lens unit is moved and to use the zoom lens system of this invention as a tilt lens.

As described above, according to this invention, the back focus variations that accompany the movement of a shift lens unit that is moved to shift the image can be compensated, and a high-powered zoom lens system can be built that has a proper image composing capacity even when the image is shifted.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A zoom lens system having at least two movable lens units comprising:

an image shifting unit, at least a portion of the image shifting unit movable along a first direction substantially perpendicular to an optical axis of the zoom lens to shift an image, wherein when the portion of the image shifting lens unit moves along the first direction it also moves along a second direction substantially parallel to the optical axis; and a compensating lens unit positioned on one of an image side and an object side of the image shifting unit;

wherein the image shifting lens unit and the compensation lens unit are integrally movable along the second direction for zooming operations, and the compensation lens unit is independently movable along the second direction to compensate for variations in an image plane of the zoom lens occurring during image shifting due to movement of the image shifting lens unit portion along the second direction.

2. The zoom lens of claim 1, wherein the compensation lens unit is movable along the second direction for focusing on a close-range object.

3. The zoom lens system according to claim 1, wherein the compensation lens unit is positioned on the object side of the image shifting unit.

4. The zoom lens system according to claim 1, wherein the zoom lens system satisfies:

$$0.25 < |fb|/ft < 0.8$$

where fb is a composite focal length from a lens unit positioned closest to an object side of the zoom lens to the image shifting unit and ft is a total focal length of the zoom lens system.

5. The zoom lens system according to claim 4, wherein the zoom lens system satisfies:

$$0.1 < |fa|/ft$$

where fa is a focal length of the image shifting unit.

6. A zoom lens system comprising:

image shifting means for shifting an image, the image shifting means movable along a first direction substantially perpendicular to an optical axis of the zoom lens system to shift an image, wherein when the image shifting means is moved in the first direction, the image shifting means also moves along a second direction parallel to the optical axis; and compensating means positioned on one of an image side and an object side of the image shifting means, the compensating means movable along the second direction independently of the image shifting means for compensating variations in the back focus of the zoom lens that occur during image shifting due to the movement of the shifting means along the second direction.

7. The zoom lens according to claim 6, wherein the compensating means is movable along the second direction for changing a distance between an object and an image plane.

8. The zoom lens system according to claim 6, wherein the compensating means is positioned closer to an object side of the zoom lens system than the shifting means.

9. The zoom lens according to claim 6, wherein the image shifting means includes at least one positive lens component and at least one negative lens component.

10. The zoom lens system according to claim 6, wherein the zoom lens system satisfies:

$$0.25 < |fb|/ft < 0.8$$

where fb is a composite focal length from a lens unit positioned closest to an object side of the zoom lens to the image shifting means and ft is a total focal length of the zoom lens system.

11. The zoom lens system according to claim 10, wherein the zoom lens system satisfies:

$$0.1 < |fa|/ft$$

where fa is a focal length of the image shifting means.

12. A zoom lens system for maintaining an optical performance while shifting an image, the zoom lens system comprising:

an image shifting lens unit, at least a portion of the image shifting unit movable along a first direction substantially perpendicular to an optical axis of the zoom lens to shift an image, wherein when the portion of the image shifting lens unit moves along the first direction it also moves along a second direction substantially parallel to the optical axis of the zoom lens system, the movement along the second direction causing a back focus variation $\Delta Bf$ and a variation amount $\Delta SA$ of a spherical aberration for highest marginal rays at any state of the zoom lens system; and at least one lens unit positioned on one of an image side and an object side of the image shifting unit, fb being a combined focal length from a lens unit nearest the object side to the image shifting unit when the zoom lens is at an approximately maximum telephoto state, wherein the following conditions are satisfied:

$$-1<\Delta SA/\Delta Bf<0$$

$$0.25<|fb|/ft<0.8,$$

wherein the at least one lens unit moves along the second direction independently of the image shifting unit to compensate for the back focus variation.

13. The zoom lens system of claim 12 wherein fa is the focal length of the image shifting unit and $0.1<|fa|/ft$.

* * * * *